US011135743B1

(12) United States Patent
Maxey et al.

(10) Patent No.: US 11,135,743 B1
(45) Date of Patent: Oct. 5, 2021

(54) REMOVAL OF SIZING MATERIAL FROM REINFORCING FIBERS FOR RECYCLING OF REINFORCING FIBERS

(71) Applicant: Vartega Inc., Golden, CO (US)

(72) Inventors: Andrew Timothy Maxey, Arvada, CO (US); Jordan Gray Harris, Denver, CO (US); Sean Paul Kline, Littleton, CO (US)

(73) Assignee: Vartega Inc., Golden, CO (US)

( * ) Notice: Subject to any disclaimer, the term of this patent is extended or adjusted under 35 U.S.C. 154(b) by 428 days.

(21) Appl. No.: 16/145,923

(22) Filed: Sep. 28, 2018

Related U.S. Application Data

(60) Provisional application No. 62/568,170, filed on Oct. 4, 2017.

(51) Int. Cl.
B29B 17/02 (2006.01)
C08J 11/08 (2006.01)
B29B 17/00 (2006.01)
C08J 11/00 (2006.01)
(Continued)

(52) U.S. Cl.
CPC ............ B29B 17/02 (2013.01); C08J 11/08 (2013.01); *B29B 2017/0293* (2013.01); *B29K 2105/0872* (2013.01); *B29K 2307/04* (2013.01)

(58) Field of Classification Search
None
See application file for complete search history.

(56) References Cited

U.S. PATENT DOCUMENTS 4,927,579 A 5/1990 Moore
5,287,632 A 2/1994 Heit et al.
(Continued)

FOREIGN PATENT DOCUMENTS

JP 365235 A 3/1991
JP 2002011301 A 1/2002
(Continued)

OTHER PUBLICATIONS

"1,1,1,2-Tetrafluoroethane." Wikipedia, Wikimedia Foundation, Jan. 29, 2017, web.archive.org/web/20170129194159/en.wikipedia.org/wiki/1,1,1,2-Tetrafluoroethane. (Year: 2017).*
"Polymer Degradation." Wikipedia, Wikimedia Foundation, Jul. 31, 2017, web.archive.org/web/20170731022009/en.wikipedia.org/wiki/Polymer_degradation. (Year: 2017).*
(Continued)

*Primary Examiner* — Alison L Hindenlang
*Assistant Examiner* — Andrés E. Behrens, Jr.
(74) *Attorney, Agent, or Firm* — Snell & Wilmer L.L.P.

(57) ABSTRACT

Processing sized fiber products to recover reinforcing fibers by removing fiber sizing material from the reinforcing fibers. The processing includes first treating the sized fiber product with a normally-liquid first solvent for fiber sizing material followed by removal of the first solvent from the first solid residue including reinforcing fibers. The removal of the first solvent from the continuous reinforcing fibers may include heating the fibers and/or second treating the first solid residue with a normally-gaseous material contacted with the solid residue under conditions of temperature and pressure at which the normally-gaseous material is in a liquid or supercritical fluid form. The processing may be performed in a continuous manner to recover the continuous reinforcing fibers in a continuous form.

18 Claims, 14 Drawing Sheets

(51) Int. Cl.
*B29K 307/04* (2006.01)
*B29K 105/08* (2006.01)

(56) References Cited

U.S. PATENT DOCUMENTS

| | | | |
|---|---|---|---|
| 5,304,576 A * | 4/1994 | Martinez | C08J 11/08 |
| | | | 521/41 |
| 6,223,904 B1 * | 5/2001 | Stephan | B29B 17/02 |
| | | | 209/3 |
| 6,626,193 B1 | 9/2003 | Arrieta et al. | |
| 8,877,872 B2 * | 11/2014 | Anderson | D01F 11/14 |
| | | | 525/374 |
| 8,920,932 B2 | 12/2014 | Adam | |
| 9,776,107 B1 | 10/2017 | Asmatulu et al. | |
| 10,487,191 B2 * | 11/2019 | Maxey | C08J 11/08 |
| 2013/0150467 A1 * | 6/2013 | Kouno | B29B 13/023 |
| | | | 521/41 |
| 2013/0192189 A1 | 8/2013 | Lawrence et al. | |
| 2014/0283348 A1 | 9/2014 | Asmatulu | |
| 2015/0273423 A1 | 10/2015 | Engels et al. | |
| 2016/0145409 A1 * | 5/2016 | Aymonier | B29B 17/02 |
| | | | 521/49.8 |

FOREIGN PATENT DOCUMENTS

| | | |
|---|---|---|
| JP | 2005336331 A | 12/2005 |
| JP | 2008189723 A | 8/2008 |
| JP | 2013107973 A | 6/2013 |
| WO | 2013050942 A1 | 4/2013 |
| WO | 2014087003 A1 | 6/2014 |
| WO | 2017171753 A1 | 10/2017 |

OTHER PUBLICATIONS

Allred et al.; "Chemical Recycling of scrap Composites"; Adherent Technologies; Albuquerque, New Mexico; N95-23034; 1994; pp. 177-188; https://ntrs.nasa.gov/archive/nasa/casi.ntrs.nasa.gov/19950016617.pdf.

Henry et al.; "Semi-continuous flow recycling method for carbon fibre reinforced thermoset polymers by near- and supercritical solvolysis"; Polymer Degradation and Stability; 2016; 38 pages.

Liu et al.; "Mild chemical recycling of aerospace fiber/epoxy composite wastes and utilization of the decomposed resin"; Polymer Degradation and Stability; vol. 139; 2017; pp. 20-27.

Marsh; "Recycling carbon fibre composites"; Materials Today; Apr. 22, 2009; http://www.materialstoday.com/carbon-fiber/features/recycling-carbon-fibre-composites/; 6 pages.

Nunes et al.; "Life cycle assessment of a steam thermolysis process to recover carbon fibers from carbon fiber-reinforced polymer waste"; Int. J. Life Cycle Assess; 2017; 14 pages.

Okajima et al.; "Chemical Recycling of Carbon Fiber Reinforced Plastic with Supercritical Alcohol"; Journal of Advanced Research in Physics 3(2); 2012; pp. 1-4.

Shibata et al.; "CFRP Recycling Technology Using Depolymerization under Ordinary Pressure"; Hitachi Chemical; Hitachi Chemical Technical Report No. 56; Mar. 2014; 8 pages.

Gosau et al.; "Carbon fiber reclamation from state-of-the-art 2nd generation aircraft composites"; International SAMPE Symposium and Exhibition (Proceedings). 54; (2009); 7 pgs.

"Composite Recycling and Disposal—An Environmental R&D Issue"; Boeing Environmental Technotes; Nov. 2003;. vol. 8, No. 4; 4 pgs.

Gosau et al.; "Integrated Composite Recycling Process"; Proc. 38th; SAMPE Tech. Conf.; Dallas, TX; Nov. 7-9, 2006; 7 pgs.

* cited by examiner

REMOVAL OF SIZING MATERIAL FROM REINFORCING FIBERS FOR RECYCLING OF REINFORCING FIBERS

CROSS REFERENCE TO RELATED APPLICATIONS

The present application claims priority to U.S. Provisional App. No. 62/568,170 filed on Oct. 4, 2017 entitled "REMOVAL OF SIZING MATERIAL FROM REINFORCING FIBERS FOR RECYCLING OF REINFORCING FIBERS," the entirety of which is incorporated by reference herein.

FIELD OF THE INVENTION

The invention relates to recovery of reinforcing fibers, such as carbon or other fibers, for recycling of such reinforcing fibers.

BACKGROUND OF THE INVENTION

Carbon fiber-reinforced polymers (CFRPs) are composite materials including carbon fibers as reinforcing agents bound in a matrix, typically a matrix of a plastic composition. The reinforcing fibers used in CFRPs typically include fiber sizing material on the surface of the fibers to, among other purposes, promote coupling with the matrix. CFRPs are used in a variety of consumer and industrial products. A high cost of virgin carbon fibers of industrial or commercial grade limits utilization in a broader-range of end-user applications, including limiting broader use in automotive and transportation sectors where there is significant potential for expanded use.

There are a variety of intermediate forms of reinforcing fiber-containing products in which reinforcing fibers, and including carbon fibers, may be present in the industrial chain between initial manufacture of the reinforcing fibers and a final CFRP in a final product form. For example, following manufacturing of the reinforcing fibers, the reinforcing fibers may be covered with a thin layer of other material or materials to protect the reinforcing fibers from damage or degradation during handling, shipping, storage and manufacture operations and/or for enhanced performance interaction with materials of, or precursors for, the matrix of the intended final CFRP product form. Such a layer is often referred to as "fiber sizing", and a material of such a layer may be referred to as a fiber sizing material. The process of applying fiber sizing may be incorporated into an integrated manufacturing operation in which fiber sizing is applied to the virgin reinforcing fibers soon after they are formed in the manufacture operation, for example to provide immediate protection to the reinforcing fibers and in a form compatible with the final intended matrix for a CFRP. Alternatively, the virgin reinforcing fibers may be stored and/or shipped in the virgin form for later processing to apply fiber sizing in a separate manufacture operation. Such reinforcing fibers following application of fiber sizing may be referred to as sized reinforcing fibers, and products with the sized reinforcing fibers prior to addition of a matrix or matrix precursor for a CFRP may be referred to a sized fiber products. Sized fiber products may be in a product form, for example, individual strands, tow (e.g., untwisted bundle), yarn (e.g., twisted bundle) or mat or sheet form (e.g., woven or nonwoven forms). Virgin fibers, without fiber sizing applied, may also be prepared into such product forms. Such product forms may be further processed, in an integrated manufacturing operation or a separate manufacturing operation, to add material for a matrix to form a CFRP, which may be in the form of the final matrix (e.g. thermoplastic matrix compositions) or in a preliminary resin composition form (e.g., uncured thermoset resin), and may be referred to as a preliminary CFRP, which will typically have the reinforcing fibers in the same general geometric arrangement (e.g., tow, yarn, sheet or mat form) as in the form prior to adding material of the matrix. A preliminary CFRP with an uncured thermoset resin material for a matrix is often referred to as a prepreg. Such a preliminary CFRPs may be used in a final product manufacturing operation in which the CFRP is shaped into and set in a desired final product form (e.g., with heating followed by cooling in the case of a thermoplastic matrix and curing in the case of a thermoset matrix). Such a final product form may be referred to as a final CFRP. Such sized reinforcing fiber products, preliminary CFRPs and final CFRPs are all examples of reinforcing fiber-containing products, which include the reinforcing fibers in combination with one or more other materials (e.g., fiber sizing material and/or preliminary or final matrix material).

Even with the high cost of virgin carbon fibers, a significant quantity of CFRPs and/or the carbon fibers therein, end up as waste. It is common in CFRP applications for material trim and scrap waste to amount to about 30% or more of finished part weight. In addition, raw materials used in manufacturing of products from fiber-reinforced composites including, for example, reinforcing fibers with fiber sizing or fiber-reinforced composites (e.g., prepreg materials) used in production of CFRPs may have a limited shelf-life prior to use in manufacturing. Often times, the raw materials expire prior to being utilized in a manufacturing process. Manufacturing waste, whether in the form of material trim, scrap, or expired product, is often incinerated or sent to a landfill resulting in additional waste disposal costs and significant lost raw material value.

Trim and scrap waste represent a possible resource for recycled carbon fibers, and attempts have been made to process such trim and scrap waste to recover carbon fibers for recycling. However, effectively freeing carbon fibers for recovery from CFRP matrix and/or sizing material has proven difficult, with a result being that recycling processing has tended to be expensive and/or to result in significant degradation of carbon fiber properties, significantly limiting utility of recycling as a source of carbon fibers for a range of possible applications. Moreover, as will be discussed in greater detail below, recycling processing has also tended to result in processed carbon fibers of a lesser or degraded form as compared to the feedstock for such processes. For instance, during recycling, fibers often are severed, tangled, or frayed, which limit the available forms for recycled carbon fiber composites.

One recycling technique involves subjecting waste materials to pyrolysis. This technique utilizes high temperatures to decompose polymeric matrix while attempting to leave the reinforcing fibers intact. The carbon fibers recovered from this processing often have a short fiber length with limited potential for reuse in new products. Also, pyrolysis, as a process option, has significant limitations with respect to intensive energy requirements, high processing costs, and potential for negative environmental impact due to emission of pyrolysis by-products.

Another type of recycling technique uses chemical agents to chemically react with and degrade, and break down the polymeric matrix (sometimes referred to as depolymerization) to degradation products that may be separated from the carbon fibers, such as by dissolution of the degradation products into a solvent. Such processes tend to be expensive and may also degrade carbon fiber properties.

In addition, while the foregoing techniques have generally been considered for use in recycling of trim and scrap waste that include discontinuous reinforcing fibers, certain sources of recyclable material include continuous fibers such as continuous prepreg sheets or continuous prepreg tow. These materials in the continuous form may provide advantages for use in manufacturing processes and/or in finished products produced using the continuous forms. For example, products manufactured with unidirectional fiber reinforced sheets or tow material may provide enhanced directionalized part performance. As such, recycling techniques applicable to discontinuous fibers, such as those resulting from trim and scrap waste, may require severing, tangling, or fraying fibers which results in degradation of the continuous form, thus degrading the resulting recycled fiber product.

A need exists for improved processes to recover carbon fibers for recycling in a manner that increases the range of applications in which recycled carbon fibers may be technically and economically suitable for use. Moreover, an approach that maintains a continuous form of carbon fibers from waste materials is needed.

SUMMARY OF THE INVENTION

It has been found that many CFRP forms may be advantageously processed to recover high quality carbon fibers using a solvent-based process that does not depend upon chemical decompositions of the matrix of the CFRP. Advantageous variations on the solvent-based processing include effective separation and removal of residual solvent and finish cleaning of recovered carbon fibers, for example to remove remaining residual matrix material and/or to remove remaining fiber sizing material. The techniques disclosed herein may be useful for processing CFRP that is in a prepreg form, such as including an uncured thermoset resin matrix in which the carbon fibers are held. There is a significant quantity of such composite prepreg waste that is generated in the form of scrap and trim waste, known as offal. Additional scrap waste results during manufacturing of product that fails to meet specification and expired prepreg composite product that is not used within a specified shelf-life for the product. In addition, the techniques disclosed herein may be used for processing of sized fiber products, whether in a matrix or in the absence of a matrix, to remove fiber sizing from the reinforcing fibers.

The solvent-based processing disclosed herein significantly reduces both processing complexity and energy requirements relative to pyrolysis and chemical depolymerization processes. This solvent-based processing is also applicable to composites including reinforcing fibers other than carbon fibers held in a matrix or other reinforcing fibers having sizing material in the absence of matrix, but the disclosure herein is made with reference primarily to carbon reinforcing fibers held in a matrix, although the principles disclosed herein also apply to recovery and recycling of other reinforcing fibers, whether in a matrix or in the absence of a matrix, as described below. For brevity, reinforcing fibers are often referred to herein simply as fibers. The solvent-based processes contemplated herein may also be advantageously used to recover and/or recycle fibers in continuous form, which may provide increased value and utility for new products to be manufactured using the recycled fibers. That is, continuous fiber-reinforced composites or continuous sized fiber product in the absence of a matrix may be recycled to maintain the fibers in the continuous form, thus improving the value and utility of the resulting recycled fibers.

In turn, the present disclosure describes a number of embodiments of methods that may be applicable to recovery and/or recycling of reinforcing fibers therefrom. The embodiments described herein may incorporate processing as described in PCT App. No. PCT/US2016/024956 entitled "RECOVERY OF REINFORCING FIBERS FROM FIBER-REINFORCED COMPOSITES" filed on Mar. 30, 2016, which is incorporated by reference in its entirety. Specifically, the embodiments described herein may apply a process of solvent-based processing to a fiber-reinforced composite or sized fiber product in the absence of a matrix.

In one particular application of the techniques described herein, a sized fiber product may be processed to remove fiber sizing material from reinforcing fibers of the sized fiber product. As used herein, fiber sizing material, fiber sizing, sizing material, or simply sizing may each be used to refer to fiber sizing material generally whether disposed on the surface of a reinforcing fiber or separate from any reinforcing fiber. Sized fiber or sized fiber product may refer to the arrangement in which fiber sizing material is applied to the surface of the reinforcing fibers. In this regard, a sized fiber product may refer to a product form that at least includes reinforcing fibers and fiber sizing material disposed on the surface of the reinforcing fibers. The fiber sizing material may be applied as a coating to the surface of the reinforcing fibers to form a sized fiber product. Such fiber sizing is often applied to carbon fibers, although fiber sizing may also be used in relation to other reinforcing fibers to produce sized fiber products. Fiber sizing material applied to the surface of reinforcing fibers in a sized fiber product may, for example, provide one or more of the following functions: protecting the fiber, preventing fiber agglomeration, improving processability of the fibers, and acting as a compatibility agent to improve dispersibility in and/or binding with matrix material. A sized fiber product may be provided in a continuous form containing continuous reinforcing fibers and may be processed as described herein in relation to processing composites in a continuous form.

For many recycling applications, it is desirable to clean the reinforcing fibers of some or all residual matrix material and/or sizing material. In other applications, such residual matrix material and/or some retained fiber sizing material may not be a problem. In some applications, sized fiber products may be provided in the absence of a matrix for recycling or recovery of the reinforcing fibers by removing the fiber sizing material from the reinforcing fibers. For higher value recycling applications, it may be preferred to remove both residual matrix material and fiber sizing material to provide clean fibers, which may then be processed to add new sizing to the fibers if desired.

For purposes of this disclosure, fiber sizing is not considered a part of either a reinforcing fiber or a matrix, and is separate from each of those terms. Rather, to the extent that reinforcing fibers of a fiber-reinforced composition are coated with fiber sizing, that fiber sizing is a separate material from the reinforcing fibers and from the matrix, even though the fiber sizing may provide a binding intermediate between the reinforcing fiber and the matrix. Reference to sized fiber product refers only to the reinforcing fibers and sizing material, although it may be appreciated that such a sized fiber product may be included in a composite including a matrix. In other applications, a sized fiber product may be processed in the absence of a matrix to remove the fiber sizing material from the reinforcing fibers.

As described below, processing to remove the fiber sizing material from the sized fiber product may be according to the disclosure herein that describes removal of a matrix and/or fiber sizing from reinforcing fibers. Any disclosure provided herein that refers to processing of a fiber-reinforced composite for removal of a matrix may also be used in conjunction with a sized fiber product in the absence of a matrix to remove fiber sizing material from reinforcing fibers.

Accordingly, a first aspect of the present disclosure includes a method for processing a sized fiber product comprising reinforcing fibers with fiber sizing material on the reinforcing fibers in the absence of a matrix for recovery of the reinforcing fibers from the sized fiber product. The method includes first treating the sized fiber product comprising reinforcing fibers with fiber sizing material on the reinforcing fibers in the absence of a matrix with a normally-liquid first solvent for the fiber sizing material to prepare a first treated solid residue comprising the reinforcing fibers. The first treating includes contacting the sized fiber product with the first solvent and first dissolving at least a majority by weight of the fiber sizing material into the first solvent. The method also includes, after the first treating, second treating at least a portion of the first treated solid residue comprising the reinforcing fibers to remove a residual portion of the first solvent associated with the first solid residue and prepare second treated solid residue.

A number of feature refinements and additional features are applicable to the first aspect. These feature refinements and additional features may be used individually or in any combination. As such, each of the following features that will be discussed may be, but are not required to be, used with any other feature or combination of features of the first aspect.

For instance, in an embodiment, the second treating may include heating the residual portion of the first solvent in the presence of the reinforcing fibers to volatilize the residual portion of the first solvent. In another embodiment, the second treating may include contacting at least a portion of the first treated solid residue comprising the reinforcing fibers with a normally-gaseous material to prepare second treated solid residue. The second treating includes contacting the at least a portion of the first treated solid residue with the normally-gaseous material under conditions of temperature and pressure at which the normally-gaseous material is in a form of a liquid or supercritical fluid.

In an embodiment, the method may include a third treating after the second treating. Such third treating may include further treating at least a portion of the second treated solid residue, including the reinforcing fibers, by first converting a normally-gaseous substance in contact with such second treated solid residue from a fluid form to a solid form. After the normally-gaseous substance is in the solid form, the third treating includes second converting of the normally-gaseous substance from the solid form to a gaseous form. Such third treating may significantly assist dislodgment from the reinforcing fibers of residual material that may include fiber sizing material. During the second converting, rapidly expanding gas may mechanically dislodge significant residual fiber sizing material from the fibers. Such second converting may involve rapid sublimation from the solid form to the gaseous form.

The first converting of such third treating may include reducing the temperature of the normally-gaseous substance from a higher first temperature to a reduced second temperature. Such a higher temperature may often be at least 0° C., at least 5° C., at least 10° C., at least 15° C., or at least 20° C.; although often the higher temperature may be no higher than 100° C., no higher than 50° C., no higher than 40° C., or no higher than 30° C. The higher temperature may typically be ambient temperature. Such a reduced temperature may be −40° C. or lower, −50° C. or lower, −56.6° C. or lower, −60° C. or lower, or −70° C. or lower. At such a higher first temperature, the normally-gaseous substance is under conditions of temperature and pressure at which the normally-gaseous substance is in the form of a gas, liquid or supercritical fluid, and preferably a liquid. At the reduced temperature, the normally-gaseous substance is under conditions of temperature and pressure at which the normally-gaseous material is in the form of a solid. In some implementations, the conditions at the reduced temperature include ambient pressure (approximately one bar). In some implementations, the conditions at the higher temperature include elevated pressure relative to ambient pressure (e.g., higher than atmospheric pressure).

The first converting may include significantly reducing pressure of the normally-gaseous substance from an elevated pressure, and reducing the temperature of the normally-gaseous substance may include gas expansion cooling as the pressure is reduced. The elevated pressure may be at least 3.0 MPa, at least 3.5 MPa, at least 4 MPa, at least 5 MPa, at least 7 MPa, at least 7.39 MPa, or at least 7.5 MPa. The elevated pressure may be a pressure as described below for the pressure during the second treating in an application where the second treating includes contacting the first treated solid residue with a normally-gaseous material in liquid or supercritical fluid form. The reducing pressure may include reducing the pressure of the normally-gaseous substance from the elevated pressure to a lower pressure of 1 MPa or lower, 0.750 MPa or lower, 0.5 MPa or lower, 0.250 MPa or lower, or even 0.15 MPa or lower, or even to about ambient pressure (approximately one bar). In some preferred implementations when using carbon dioxide as the normally-gaseous substance, the reducing temperature may include reducing the temperature to a temperature at or below the triple point for carbon dioxide (−56.6° C.) and preferably even lower (e.g., at or below −60° C.), or even to a temperature at or below the normal sublimation point of carbon dioxide (−78.5° C.). Similarly, when using carbon dioxide as the normally-gaseous substance, such a lower pressure of such a reducing pressure step may preferably be at or below the triple point pressure of carbon dioxide (0.518 MPa), and more preferably below such a triple point pressure (e.g., at or close to ambient pressure).

The second converting preferably includes rapidly converting the normally-gaseous substance from the solid form to the gaseous form in a short time period for effective dislodgment of residual fiber sizing material. Such a time period may be, for example, no greater than 120 seconds, no greater than 60 seconds, no greater than 45 seconds, no greater than 30 seconds, no greater than 20 seconds, no greater than 15 seconds, no greater than 10 seconds, or no greater than 5 seconds, although such time period may often be at least 1 second. The second converting may include contacting second treated solid residue with a heat transfer fluid at a greater temperature than the reduced temperature of the solid form of the normally-gaseous material, for example, with the temperature of the heat transfer fluid immediately prior to contacting with the second treated solid residue being at least 5° C. greater than, at least 10° C. greater than, at least 25° C. greater than, at least 50° C. greater than, at least 75° C. greater than, at least 100° C. greater than or even at least 150° C. greater than the reduced temperature, although often also being not more than 225° C. greater than the reduced temperature. The heat transfer fluid may be in the form of a gas, liquid, or a supercritical fluid when contacted with the second treated solid residue and the solid form of the normally-gaseous material. Some example heat transfer fluids include an oil, liquid water, steam (saturated or superheated), air, nitrogen, and carbon dioxide. The second converting may include rapid sublimation of the normally-gaseous substance from the solid form.

The normally-gaseous substance of the third treating may be any normally-gaseous material that may be subjected to such first and second converting. Some example materials for the normally-gaseous substance for the third treating include any of the normally-gaseous materials, or combinations thereof, identified for the normally-gaseous material of the second treating that includes contacting the first residual solid with a normally-gaseous material in liquid or supercritical fluid form, with carbon dioxide being preferred for use in both the second treating and the third treating. The normally-gaseous substance of the third treating may be of the same composition or a different composition than the normally-gaseous material of the second treating of the first residual solid with a normally-gaseous material in liquid or supercritical fluid form. In some preferred implementations, the normally-gaseous substance of the third treating is the same as the normally-gaseous material of the second treating that includes contacting the first residual solid with a normally-gaseous material in liquid or supercritical fluid form, and in more preferred implementations, the normally-gaseous substance of the third treating is made up of some or all of the normally-gaseous material of the second treating that remains in contact with the second treated solid residue at the conclusion of the second treating (e.g., carbon-dioxide remaining from the second treating).

The second treated solid residue resulting from the second treating should preferably be mostly free from the presence of the first solvent and more preferably should be essentially free of the presence of the first solvent, or stated in a different way the second treated solid residue is preferably essentially in a completely dried state relative to the first solvent. The second treated solid residue will also typically have a very high content of the reinforcing fibers, but may still contain some minor amounts of other materials (e.g., residual fiber sizing material). The reinforcing fibers may, for example make up at least 90 weight percent, at least 95 weight percent, at least 98 weight percent, or even at least 99 weight percent or more (e.g., essentially 100 weight percent) of the second treated solid residue. The second treated solid residue may have essentially the same composition as the first treated solid residue, but dried of the first solvent, for example, when the second treating is essentially in the absence of any significant dissolution of fiber sizing into the liquid or supercritical fluid form of the normally-gaseous material. Alternatively, the second treated solid residue may have a higher weight percentage of reinforcing fibers and a correspondingly lower weight percentage of other materials, for example when the liquid or supercritical fluid form of the normally-gaseous material dissolves some portion of fiber sizing material.

When the method includes the third treating, a product of such third treating may be third treated solid residue, which may be a cleaned product after separating dislodged pieces of fiber sizing, for example by flushing them away with heat transfer fluid, effluent of the normally-gaseous substance or another flushing fluid. Such a cleaned product may include mostly or even essentially all reinforcing fibers and preferably with a reduced content or even essentially free of residual fiber sizing. The reinforcing fibers may make up at least 90 weight percent, at least 93 weight percent, at least 96 weight percent, at least 98 weight percent, at least 99 weight percent, at least 99.5 weight percent, or at least 99.8 weight percent of such a cleaned product.

In preferred implementations, a majority or even most of the fiber sizing material is dissolved into the first solvent during the first treating. For example, the first treating may include dissolving into the first solvent at least 60 weight percent, at least 70 weight percent, at least 80 weight percent, at least 90 weight percent, at least 95 weight percent, at least 97 weight percent, at least 98 weight percent or even at least 99 weight percent or more of the fiber sizing material into the first solvent during the first treating. In some implementations, the first treating may include dissolving into the first solvent all (100 weight percent) or essentially all of the fiber sizing material. In some implementations, the first treating may include dissolving into the first solvent up to 99.8 weight percent, up to 99.5 weight percent, up to 99 weight percent, up to 98 weight percent, up to 97 weight percent, up to 95 weight percent or up to 90 weight percent of the fiber sizing material.

The dissolving during the first treating may be conducted at any convenient temperature (e.g., temperature of the first solvent during the dissolving), but typically at a temperature that is lower than a normal boiling point of the first solvent. In some implementations the temperature may be in a temperature range having a lower limit of 0° C., 10° C., 15° C., or 20° C.; and an upper limit of 40° C., 35° C., or 30° C. In some implementations, the temperature may be essentially ambient temperature. The dissolving may be conducted under an elevated pressure, but is often conducted at ambient pressure (approximately one bar). In some implementations, the pressure during the dissolving may be in a range having a lower limit of 0.08 MPa, 0.1 MPa, 0.15 MPa, or 0.2 MPa; and an upper limit of 2 MPa, 1 MPa, 0.7 MPa, 0.5 MPa, or 0.3 MPa.

A sized fiber product may include surface treatments on the fiber or on the fiber sizing material, dispersing agents, and compatibilizing agents. In some preferred implementations, the amount of any one or of all components other than the reinforcing fibers make up no more than 10 weight percent, no more than 5 weight percent, no more than 3 weight percent, or no more than 1 weight percent of the sized fiber product. The fiber sizing material may include a member selected from the group consisting of maleic anhydride grafted polypropylene, polyurethane, epoxy, polyamide, polyimide, phenoxy ethylene maleic anhydride, butadiene maleic anhydride, ethylene acrylic acid, acrylic dispersions, a silane compound, or combinations thereof.

The reinforcing fibers may include fibers of a single type or may include fibers of multiple different types. The reinforcing fibers may be limited to including only one of the following or any number of two or more of the following types of fibers: carbon fibers (preferred), carbon nanotube fibers, aramid fibers, glass fibers, boron fibers, basalt fibers, high-modulus polyethylene fibers, poly p-phenylene-2,6-benzobisoxazole fibers, quartz fibers, ceramic fibers, stainless steel fibers, titanium fibers, copper fibers, nickel fibers, metal coated fibers (e.g., coated with silver, gold, ruthenium, Miralloy®, alloys, etc.), natural fibers and mineral fibers. The fibers may include only a single material phase (e.g., fibers composed of a single, uniform material) or may be multi-phasic structures (e.g., metal coated fibers including a core of one material phase and different metal coating material phase). Such fibers will typically have a diameter in a micro-size range (e.g., 100 microns or smaller) or even a nano-size range (e.g., smaller than one micron).

The first solvent may be any liquid composition that is a solvent for material of the fiber sizing material, and that preferably is chemically nonreactive, and more preferably chemically inert, with respect to the reinforcing fibers. While the present aspect relates to processing of a sized fiber material in the absence of a matrix, it may be appreciated that the first solvent may also be a solvent for a matrix of a fiber-reinforced composite as described herein. In this regard, either or both of a sized fiber product in the absence of a matrix or a fiber-reinforced composite including a matrix may be processed according to the same technique provided herein. This may be advantageous as equipment setups, chemical baths, or the like used in processing described herein may not need to be changed between processing a sized fiber product in the absence of a matrix and a fiber-reinforced composite held in a matrix.

By a material being chemically nonreactive with respect to another material, it is meant that the material, under conditions of temperature and pressure during the relevant processing, is essentially not chemically reactive with the other material. By a material being chemically inert to another material, it is meant that the material, under conditions of temperature and pressure during the relevant processing, is essentially not chemically reactive with the other material and is essentially not a solvent for the other material. The first solvent may be a single component or may be a multi-component mixture of multiple components that together provide the desired solvating properties for dissolving fiber sizing material. The first solvent may include any one or any combination of two or more of the following, with or without other additional components: acetone, methylene chloride (preferred), methoxy-nonafluorobutane, 2-methyltetrahydrofuran, tetrahydrofuran, tetrachloroethylene, n-propyl bromide, dimethyl sulfoxide, polyolester oil, esters, ethers, acetates, acids, alkalis, amines, ketones, glycol ethers, glycol ether esters, ether esters, ester-alcohols, alcohols, halogenated hydrocarbons, paraffinic hydrocarbons, aliphatic hydrocarbons, aromatic hydrocarbons, and combinations thereof.

In some preferred implementations, a result of the first treating is that most of the fiber sizing material has been dissolved into the first solvent and the first treated solid residue is made up mostly of reinforcing fibers. For example reinforcing fibers may make at least 70 weight percent, at least 80 weight percent, at least 90 weight percent, at least 95 weight percent, at least 98 weight percent or even at least 99 weight percent or more (but often less than 100 weight percent) of the first treated solid residue. The first treated solid residue may include minor quantities of other material, other than the reinforcing fibers, for example some residual fiber sizing material (e.g., undissolved or re-precipitated during processing).

The method may typically include prior to the second treating (i.e., as part of processing during the first treating or between the first treating and the second treating) separating first solvent loaded with dissolved fiber sizing material (rich first solvent) from the first treated solid residue. Such separation may include any liquid-solid separation technique, for example any one or more of the following: settling and decantation (including accelerated settling through centrifugal extraction), cyclone separation, and/or filtration. Filtration may, for example, involve filtration in which first solvent passes through filter medium as filtrate and first treated solid residue remains with retentate. Preferably a majority or even most of the first solvent will be separated from the first treated solid residue by such processing. However, even after such filtration or other liquid-solid separation, the first treated solid residue may still be in the presence of some amount of residual first solvent, which is problematic in terms of practical utility of the reinforced fibers in the first treated solid residue. In preferred processing, a normally-gaseous material in the liquid or supercritical form used in the second treating involving such a material acts as a second solvent (of a different composition than the first solvent) during the second treating to dissolve some, and preferably essentially all, such residual first solvent that remains in the presence of the first treated solid residue. Such liquid or supercritical fluid form may also have some solvating capability for dissolving some amount of the fiber sizing material in the first treated solid residue that may remain in the first treated solid residue. However, it is typically preferred that such liquid or supercritical fluid form be a good solvent for the first solvent, with dissolution of additional residual fiber sizing material being a secondary, but not necessary benefit if available. It will be understood that terms such as "first solvent" and "second solvent" are for convenience of reference and do not mean or imply that processing necessarily includes more than one solvent or any particular number of different solvents, except as stated.

The normally-gaseous material may be comprised of a single normally-gaseous component or a normally-gaseous mixture of multiple different components wherein the mixture is normally-gaseous, whether or not all of the components of such mixture are normally-gaseous individually. Preferably, such a normally-gaseous mixture is made up essentially of only components that are each individually normally-gaseous. By a material being normally-gaseous it is meant the material is in the form of a gas at conditions of 0.1 MPa pressure and 25° C. temperature. By a material being normally-liquid it is meant the material is in the form of a liquid at conditions of 0.1 MPa pressure and 25° C. temperature. The terms material and substance are generic terms for compositions that include one or more than one component, and the terms are used interchangeably herein. Different ones of these terms may be used in different portions of this disclosure for convenience of reference. Some example materials that may be or may be a part of the normally-gaseous material include any one or any combination of two or more of the following, with or without the presence of any other component or components: carbon dioxide, 1,1,1,2-tetrafluoroethane, difluoromethane, pentafluoroethane, and combinations thereof. In preferred implementations, the normally-gaseous material is chemically nonreactive, and even more preferably is chemically inert, with respect to the reinforcing fibers. A preferred normally-gaseous material for the second treating comprises carbon dioxide, and more preferably consists essentially of carbon dioxide.

As noted, during the contacting of the second treating with a normally-gaseous material is in the form of a liquid or a supercritical fluid. The pressure at which such contacting is conducted, may often be within a range having a lower limit of 2 MPa, 3 MPa, 3.5 MPa, 4 MPa, 5 MPa, 7 MPa, 7.39 MPa, or 7.5 MPa; and an upper limit of 69 MPa, 50 MPa, 40 MPa, 30 MPa, 20 MPa, or 10 MPa, and such a range is particularly preferred in the case of carbon dioxide as the normally-gaseous material. The temperature of the contacting of the second treating may often be within a range having a lower limit of 0° C., 10° C., 13° C., 15° C., 20° C., or 30° C. and an upper limit of 175° C., 150° C., 125° C., 100° C., 75° C., 60° C., 50° C., or 40° C., provided that the upper limit is higher than the lower limit, and such a range is particularly preferred in the case of carbon dioxide as the normally-gaseous material. As will be appreciated, a supercritical fluid refers to a fluid at a temperature and pressure above the critical temperature and critical pressure for the material, for example at a temperature above 31.1° C. and a pressure above 72.9 atmospheres (7.39 MPa) in the case of carbon dioxide as the normally-gaseous material.

As stated above, the sized fiber product may be provided for processing in the absence of a matrix. Such a matrix may be provided as a plastic material or plastic compound that holds reinforcing fibers in a fiber-reinforced composite. A sized fiber product may be provided with reinforcing fibers having fiber sizing material on the surface of the fibers that has not had a matrix applied thereto or in which a matrix has been removed leaving the reinforcing fibers and sizing material. The terms plastic material and plastic composition are used interchangeably herein. By the matrix of a fiber-reinforced composite being a plastic material it is meant a "set" plastic composition, which may be a thermoplastic material (reversibly set by thermal processing) or may be a cured thermoset composition (irreversibly set chemically, also referred to as a "thermoset"). By "precursor", "precursor composition", "thermoset precursor composition" or the like for a plastic material it is meant a preliminary composition that is to undergo additional chemical reaction to prepare that plastic material, which may be for example a final cured thermoset composition for a final thermoset matrix. Such a precursor may be an uncured thermoset resin (which may also be referred to as an uncured thermoset resin composition or thermoset prepolymer composition). As used herein, an "uncured" composition refers to precursor that has not been subjected to curing or has been only partially cured, such that additional curing is required to prepare the final plastic composition (e.g., to prepare a final thermoset). In contrast, a "cured" composition refers to such a final plastic composition after completion of all curing operations (e.g., a final thermoset). Such a precursor composition is typically malleable and re-formable in shape to at least some degree, whereas a cured thermoset composition may be irreversibly chemically set and may typically not be malleable or re-formable in shape (is permanently shaped). Curing typically involves one or more chemical reactions, often including cross-linking. A composite including reinforcing fibers and a matrix of such a precursor for a plastic material may be referred to as a "thermoset prepreg composite", a "prepreg composite" or even simply as "prepreg". Curing of a precursor composition may be induced or caused by a variety of stimuli depending on the composition, for example through the application of heat and/or radiation. By "plastic material" or "plastic composition" it is meant a composition composed predominantly of polymer components, but which may include minor amounts of various additives, for example, plasticizer or other additives (e.g., various processing aids, mold release agents). Precursor compositions for a plastic material may include un-crosslinked polymer components and a variety of other components, for example curing agents (e.g., cross-linking agents), processing aids (e.g. viscosity modifiers), plasticizers and other additives.

Examples of some uncured thermoset resin compositions of a precursor composition may be or include: epoxy resins, phenolic resins, polyester resins, unsaturated polyesters, polyimide resins, polyimine resins, polyurethane resins, vinyl esters, cyanate esters, bismaleimides, benzoxazines, phthalonitriles, polybutadiene, and combinations thereof. Some example themoset matrix materials include any cured composition made using such example precursor compositions. Some specific thermoset matrix materials, or precursor compositions or components for such precursor compositions, include Recyclamine® (epoxy resin, Conora Technologies) and Recycloset™ (epoxy resin Adesso Advanced Materials). As noted, the composite may include a thermoset prepreg composite. Such prepreg may be or include scrap and/or trim prepreg waste.

As noted, a matrix may be or include a thermoplastic composition. Some example thermoplastic compositions include those based on or including: polyolefins (e.g., including polyethylene, polypropylene and/or propylene-ethylene copolymers), polyethylene terephthalates (PET), polybutylene terephthalates (PBT), polycarbonates, acrylonitrile butadiene styrenes (ABS), polyamides, polyetheretherketones (PEEK), polyetherketones (PEK), polyamideimides, polyarylsulfones, polyetherimides (PEI), polyethersulfones, polyphenylene sulfides, liquid crystal polymers, cyclic thermoplastic polyesters, and combinations thereof.

As can be appreciated, in such composites, the matrix may hold or otherwise retain the reinforcing fibers in a certain arrangement or orientation. While the sized fiber product is provided in the absence of such matrix, the surface properties of the sized reinforcing fibers may provide some degree of interaction between respective ones of the reinforcing fibers. However, this potential interaction is not intended to define a matrix. Moreover, upon removal of the fiber sizing material from the reinforcing fibers, the reinforcing fibers may move to a different orientation, possibly at least in part due to a change in the relative surface characteristics between fibers. This does not result in the sized fiber product being provided in a matrix even if the degree to which reinforcing fibers are mechanically stable relative to one another is decreased after processing to remove fiber sizing from the reinforcing fibers. That is, a matrix is intended to refer to a matrix including a plastic material or plastic composition described above such that sized fiber product including only reinforcing fibers and fiber sizing material is not considered to define a matrix regardless of any interaction of the fibers or change in interaction of the fibers before or after processing to remove the fiber sizing material from the fibers. During the first treating, the dissolution of fiber sizing material may be conducted to a degree to remove a majority or even most of the fiber sizing material, so that after the first and second treating, the fibers may have different interaction, orientation, or arrangement.

In an embodiment, the sized fiber product may be in a continuous form comprising continuous reinforcing fibers. In addition, the first treated solid residue and the second treated solid residue each includes the continuous reinforcing fibers maintained in the continuous form. Continuous forms of a sized fiber product may include any product that includes continuous reinforcing fibers. Examples of contemplated continuous forms include unidirectional sheet material, tow, and fabric. In this regard, the continuous form may include substantially only unidirectional fibers (e.g., unidirectional sheet or tow) or may include multiaxial fibers having at least a portion of the fibers arranged such that the fibers extend in a continuous manner along a given axis of the material (e.g., non-woven or woven fabric). While the present disclosure contemplates maintaining reinforcing fibers of the sized fiber product to be processed in the continuous form, it may be appreciated that maintaining the fibers in continuous form may include maintaining substantially all or even most of the fibers in continuous form. For instance, certain portions of the reinforcing fibers may be trimmed or otherwise disturbed in the process described herein. However, such portions are preferably minimized and may comprise no more than 10% of the total continuous reinforcing fiber processed, no more than 5% of the total continuous reinforcing fiber processed, or no more than 1% of the total continuous reinforcing fiber processed. Additionally, continuous reinforcing fibers are intended to refer to reinforcing fibers that may extend in a continuous form for a given length (e.g., relative to a length of the sized fiber product spooled about a source spool). The given length of a continuous form, for example, as provided on a spool, that is provided as feed to processing, or that is subjected to solvent processing (e.g., after end trimming) may be at least about 1 m, at least about 5 m, at least about 10 m, at least about 25 m, at least about 50 m, or even at least about 100 m. It may be appreciated that the continuous reinforcing fibers may, but need not, extend along an entirety of a major length of the sized fiber product to be recycled or from which fibers are to be recovered.

By a continuous form it is meant a reinforcing fiber configuration (e.g., uniform or repeating pattern) extending over a significant length of a product form (e.g., initial product, intermediate processing product such as in a web, or final product). Examples of such continuous forms include unidirectional fiber forms (e.g., in composite tows) or, woven fiber forms (e.g., in reinforced fabric sheets) or nonwoven fiber form (e.g. in reinforced fabric sheets) that extend in a continuous manner over a significant length for example over any of the lengths identified above. Such products including a continuous form of reinforcing fibers may be referred to as continuous products or continuous-form products. Reinforcing fibers in such a continuous form may be referred to herein as continuous reinforcing fibers or continuous-form reinforcing fibers. As may be appreciated, a continuous form including the reinforcing fibers may or may not be longer than the lengths of individual reinforcing fibers contained in the continuous form (e.g., fibers spun together into a longer thread-like form). In preferred embodiments, the continuous form of the reinforcing fibers is such that it has sufficient structural integrity to be spooled and unspooled without destroying the continuous form even in the absence of a matrix or when the matrix of an original fiber-reinforced composite has been completely removed. As may be appreciated, when reference is made to maintaining a continuous form during processing it is not meant that there may be no change, however small, to the reinforcing fiber configuration. For example, as described above, after the fiber sizing is removed from a sized fiber product, the geometry of the reinforcing fibers may move or reorient to some degree within the continuous form, as the reinforcing fibers may reorient in the absence of fiber sizing on the surface of the reinforcing fibers. For example, a continuous form generally may expand or contract by some degree during processing, for example as a result of a magnitude of tension applied during spool-to-spool processing of the continuous form in the absence of fiber sizing material.

Such continuous products may be provided in spools of material or the like. Spooled material in a form as may be available for recycling processing may be difficult to process using the solvent-based approached described herein as the physical arrangement of the spooled continuous material may provide difficulty in effective solvent treatment to the entirety of the depth of the spooled material with a solvent. As such, approaches described herein may include respooling continuous fibers onto a different spool in a manner more advantageous for effective solvent treatment of the fibers prior to exposing the continuous fibers to the solvent-based approached described herein. Such respooling may include transferring the fibers to a spooled form having characteristics advantageously enhanced for effective solvent-based processing. This may include selection of spool material and/or designs compatible with or optimized for more uniformly exposing the fibers to the solvent. In some embodiments, such a selectively respooled form may advantageously be treated with solvent as a unit with the continuous form of reinforcing fibers retained on the spool during solvent contacting.

The present disclosure also includes embodiments in which the solvent-based techniques described herein may be applied to fibers in a continuous form as the fibers in the continuous form are transferred between a first or source spool and a second spool, such as a destination or intermediate spool. Such processing may be carried out such that a single solvent treatment is carried out as fibers are passed from spool to spool with multiple phases of spooling to accomplish respective ones of the treating steps of the solvent-based processing. Alternatively, multiple solvent treatments may be carried out in a single instance of passing fibers from a first spool to a second spool.

These processes may include processing in a web including the continuous form of fibers that is separated from and extends between spools. As will be described in greater detail below, reference to a web is intended to refer only to a portion of material separated from a spool (e.g., the portion of fibers suspended between a first spool and second spool) during spool-to-spool processing and is not intended to denote any particular form or composition of the material within such a material portion. That is, a web may include unidirectional or uniaxial fiber orientations or may have, but need not have, multiaxial fiber orientations. In this regard, while the web may include reinforcing fibers that extend between spools, the composition of the web may be altered by processing as it is transferred between the spools (e.g., through removal and/or addition of matrix and/or fiber sizing during processing).

Processing described herein carried out on the web may have advantages relative to effective contracting of the web material with solvent during solvent treatment of the present disclosure. That is, while spooled material may be difficult to uniformly adequately wet with a solvent in a given treating, treating the material in a web between spools may facilitate more uniform treatment of the material with a solvent, thus allowing for processing of very large quantities of sized fiber product provided in large spools (e.g., with layer counts of 100 or more layers, 200 or more layers, 500 or more layers, or even 1000 or more layers). In any regard, the processing described herein may maintain reinforcing fibers in a continuous form during the recycling to minimize severing, tangling, or fraying of the fibers.

In an embodiment, the sized fiber product may be respooled to a destination spool adapted for performing the first treating and/or second treating on the sized fiber product on the destination spool. In this regard, the method may include transferring the sized fiber product in the continuous form from a source spool to the destination spool. The transferring may occur prior to the first treating. In this regard, the spooled material about the destination spool may undergo the solvent-based processing, which may involve solvent treating the composite on the spool as a unit, rather than as a web between spools.

Accordingly, the source spool may be comprised of a first material of construction and the destination spool may be comprised of a second material of construction. The first material may be different than the second material. Specifically, the second material may be compatible with the first solvent and the second solvent. As an example, the second material may be stainless steel or the like.

In addition, the destination spool may be configured to assist in effectively treating the material with the fibers spooled thereabout. For example, the destination spool comprises a perforated cylindrical body about which the continuous reinforcing fibers are wound. In addition, a spool dimension of the destination spool may be different than the corresponding spool dimension of the source spool. The spool dimension comprises at least one of a spool length or a spool diameter. In an embodiment, the destination spool diameter may be smaller than the source spool diameter. Additionally or alternatively, the spool length of the destination spool may be larger than the spool length of the source spool. The spool dimension for the destination spool may be selected to improve wetting of the fibers and/or to optimize the size of a vessel required to house the destination spool. Advantageously, increasing spool length may provide fewer layers of wound material to penetrate with a solvent and/or a smaller diameter spool that may be processed in a smaller-diameter pressure vessel.

In addition to the physical properties of the spool, the manner in which the fibers are wound about the destination spool may be configured to assist in fiber wetting. As such, the continuous reinforcing fibers may be wound on the destination spool in a manner different than the source spool. In an embodiment, the continuous reinforcing fibers may be wound on the destination spool in a wind geometry different than the source spool. The wind geometry may include the angle relative to the spool at which the fibers are wound about the spool, fiber spacing relative to the spool, the number of fiber layers provided on the spool, or the like.

It may be appreciated that treatability of fibers on the destination spool may at least in part be based on the number of layers provided on the destination spool. As such, the destination spool dimension and wind geometry may be selected to maximize the amount of fiber accepted on the destination spool while minimizing the number of layers of fiber on the destination spool. In any regard, a maximum wind thickness for the destination spool may be established. In various embodiments, the continuous reinforcing fibers are wound onto the destination spool at a wind thickness of no more than 100 layers of the sized fiber product, no more than 50 layers of the sized fiber product, no more than 25 layers of the sized fiber product, or even no more than 10 layers of the sized fiber product.

In another embodiment, the continuous reinforcing fibers may be treated with solvent treatments of the solvent-based processing as the fibers are transferred between a first spool and a second spool. Accordingly, the method may include transferring a web comprising the continuous reinforcing fibers in the continuous form between a source spool and an intermediate spool. The first treating comprises contacting the web with the first solvent to prepare the first treated solid residue comprising the continuous reinforcing fibers. In turn, the method may include spooling the first treated solid residue on the intermediate spool with the reinforcing fibers maintained in the continuous form.

In an application, at least a portion of the web is passed through a first bath of the first solvent during the first treating. Additionally, in some contexts, at least a portion of at least one of the source spool or the intermediate spool may be immersed in the first bath of the first solvent during the first treating. Further still, the source spool, the intermediate spool, and the web may be immersed in the first bath of the first solvent during the first treating. As may be appreciated, while contacting the web with the first solvent may allow for significant interaction between the solvent and the sizing material contained in the web, contact with the source spool or destination spool may also facilitate contact between at least some of the external-most layers of the spool. As such, disposing one or more of the spools in the solvent bath may assist in facilitating contact of the sized fiber product with a solvent. In another approach, the web may contact a roller to guide the web on a path through the first bath of the first solvent. In this regard, the spools may be maintained outside the first solvent bath and only the web may be contacted with the solvent.

The method may also include transferring the web of the continuous reinforcing fibers between the intermediate spool and a destination spool. The second treating may include contacting the web with the second solvent to prepare the second treated solid residue comprising the reinforcing fibers and spooling the second treated solid residue on the destination spool in the continuous form. In this regard, like with respect to the processing of the web in the first treating, the second treating may include passing at least a portion of the web through a second bath of the second solvent during the second treating. In an application, at a portion of at least one of the intermediate spool or the destination spool may be immersed in the second bath of the second solvent during the second treating. In another application, the intermediate spool, the destination spool, and the web are immersed in the second bath of the second solvent during the second treating. In an approach, the web may contact a roller to guide the web along a path through the second bath of the second solvent.

In an application, the source spool and the destination spool may comprise a common spool. That is, the web may be transferred between the source spool and the intermediate spool and the first treating may be carried out with respect to the continuous reinforcing fibers during this transferring. Subsequently, the web may be transferred between the intermediate spool and the source spool (e.g., returned to the source spool as the destination spool) and the second treating may be carried out with respect to the continuous reinforcing fibers during the transferring between the intermediate spool and the source spool as the destination spool.

In an application, a solvent treatment may be carried out using a spray of solvent that contacts the web of reinforcing fibers. As will be discussed in greater detail below, use of such a spray of solvent may provide efficiencies in relation to solvent usage and/or improved mechanical actions of the spray relative to the web. In any regard, at least a portion of the web may be contacted with a continuous spray of the first solvent during the first transferring. Similarly, at least a portion of the web may be contacted with a continuous spray of the second solvent during the second transferring.

While the foregoing contemplated use of an intermediate spool about which the first treated solid residue is wound prior to undergoing the second treating, in at least some embodiments, both the first treating and second treating may be performed on a web extending between a first spool and a second spool. In this regard, both the first treating and the second treating may occur in relation to a single instance in which the continuous reinforcing fibers are transferred from the first spool to the second spool. As such, the method may include transferring a web comprising the continuous reinforcing fibers between a source spool and a destination spool. The first treating may include contacting the web comprising the fiber-reinforced composite from the source spool with the first solvent to prepare the first treated solid residue comprising the continuous reinforcing fibers. The second treating may include removing the residual portion of the first solvent from the first treated solid residue from the web following the first treating and prior to destination spool (e.g., using a heating element and/or second solvent).

In an embodiment, a first bath of the first solvent and a second bath of the second solvent may be provided. As such, the web be guided by a plurality of rollers along a path through the first bath of the first solvent and through the second bath of the second solvent between the source spool and the destination spool. As may be appreciated, a portion of the web (e.g., the portion between the source spool and the first bath) may comprise sized fiber product. Additionally, a portion of the web may comprise first treated solid residue (e.g., the portion between the first bath and the second bath). Further still, a portion of the web may comprise second treated solid residue (e.g., the portion of the web between the second bath and the destination spool). In addition, in the context in which the web is exposed to both the first treating and second treating, sprayers may be used for solvent application. In this regard, the first treating may include contacting the web with a continuous spray of the first solvent during the first transferring. Additionally or alternatively, the second treating may include contacting the web with a continuous spray of the second solvent during the second transferring.

Regardless of the manner in which the first treating and/or second treating occurs, as described above, the continuous reinforcing fibers may be configured as tow, a unidirectional sheet, a nonwoven fabric, or a woven fabric. Additionally, it has been found that it may be advantageous to maintain the web, and the continuous reinforcing fibers, in tension during processing to help reduce fraying and tangling of the fibers. Accordingly, the method may include maintaining a tensile force on the web, and on the continuous reinforcing fibers in the continuous form, during the transferring. The tensile force may be at least about 20 N, and in some embodiments, may be less than 1,000 N. The tensile force maintained on the web may be, at least in part, based on the size (e.g., including sheet width, tow size, or the like) and/or form of the reinforcing fibers (e.g., sheet, tow, etc.). While the continuous reinforcing fibers may be any appropriate material as described above, in preferred embodiments, the continuous reinforcing fibers comprise carbon fibers.

Furthermore, the processing of the continuous reinforcing fibers may include additional processing beyond the solvent-based processing to remove the sizing material from the reinforcing fibers. For instance, the continuous reinforcing fibers may be further processed while maintaining the reinforcing fibers in the continuous form. This may include application of sizing material to resize the continuous reinforcing fibers. Additionally, a resin material may be applied to the reinforcing fibers after processing to remove the original fiber sizing material and after application of new fiber sizing material. Accordingly, the method may include, after the second treating, contacting at least a portion of the second treated solid residue with at least one of a sizing material or a resin material (e.g., to establish a matrix relative to the continuous reinforcing fibers). The second treated solid residue may be maintained in the continuous form during the contacting of the second treated solid residue with the sizing material and/or the resin material. Specifically, the contacting the second treated solid residue with the sizing material and/or resin material may occur prior to winding the continuous reinforcing fibers onto the destination spool.

Furthermore, it may be understood that the processing described in the present disclosure may, at least in part, be performed in one or more process vessels that may contain one or more of the spools, web, and/or solvents. In an embodiment, the first treating and the second treating may occur in a single process vessel. Alternatively, the first treating and second treating may occur in different process vessels. In any regard, it may be appreciated that the normally-gaseous second solvent may be maintained in a liquid or supercritical fluid form. In this regard, the process vessel in which the second treating using the second solvent occurs may be maintained at an elevated pressure (e.g., of at least 2 MPa). This may be regardless of whether the second treating using the second solvent occurs in the same or a different process vessel as the first treating. Accordingly, the process vessel in which the first treating occurs may be at the elevated pressure or may be maintained at a pressure in a range of from 0.1 MPa to 1 MPa during the first treating.

In a particular embodiment, the single process vessel used in the first treating and second treating may include both a first bath of the first solvent and a second bath of the second solvent. In this regard, the first solvent may be isolated from the second solvent in the single process vessel. In an alternative embodiment, the first solvent may be introduced into the single vessel for the first treating during a first time period and the second solvent may be introduced into the single vessel for the second treating during a second time period. The first time period and the second time period may be different (e.g., include distinct and non-overlapping time periods).

The method may include additional processing steps, for example, before the first treating (e.g., to prepare a feed of the sized fiber product to the first treating), between the first treating and the second treating (e.g., liquid-solid separation or thermal drying to vaporize a portion of residual first solvent) or after the second treating (e.g., a third treating). Likewise, the first treating may include processing in addition to the dissolving and the second treating may include processing in addition to the contacting. The method may include multiple first treating, second treating and/or third treating steps, which may be consecutive or separated by one or more intervening processing steps.

The method may also include ancillary operations, for example, for recovering, treating and/or recycling one or more of the following:
   first solvent used to dissolve sizing material during the first treating,
   sizing material dissolved into the first solvent during the first treating, and
   normally-gaseous material used in the second treating.

For example, the method may include recovering rich first solvent from the first treating, with the rich first solvent being rich in dissolved material of the sizing, distilling the rich first solvent to vaporize first solvent, and preferably accompanied by precipitation of solids of the material of the sizing. Distilled vapor of the first solvent may be condensed and recycled as feed to the first treating. Precipitated solids of sizing material may be recovered (e.g., by filtration of distillation bottoms) and may be recycled.

As another example, the method may include recovering some or all of the normally-gaseous material from the second treating, recovering any dissolved material from the normally-gaseous material following the second treating (e.g., through pressure reduction to reduce solubility and/or distillation to convert the normally-gaseous material to a gas form at elevated pressure), or separating from the normally-gaseous material any suspended fine solids that may be mixed with the normally-gaseous material as recovered from the second treating. Cleansed normally-gaseous material may then be compressed and/or subjected to temperature adjustment as needed and recycled as feed for additional use in the second treating operation. The normally-gaseous substance of the third treating may also be recovered following the second converting and likewise processed and recycled.

Other aspects, feature refinements and additional features are disclosed in and/or will be apparent from the drawings in conjunction with the summary provided above and the description that follows and from the appended claims.

DETAILED DESCRIPTION

Figure 1:
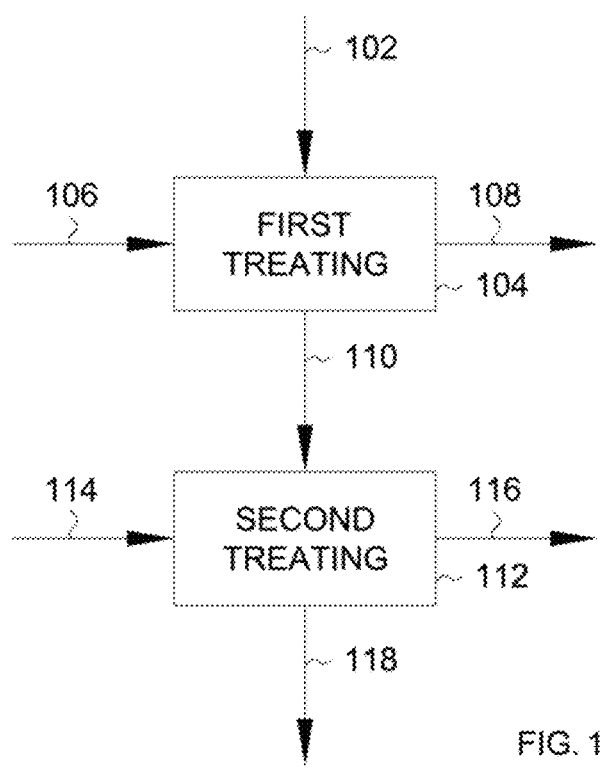
FIG. 1 is a generalized process block diagram illustrating an example of processing of an aspect of this disclosure.

FIG. 1 show a generalized process block diagram illustrating some example implementations of a method for processing a fiber-reinforced composite for recovery of reinforcing fibers. As described above, while the following description generally describes processing of a fiber-reinforced composite to remove a matrix and/or fiber sizing material from reinforcing fibers, the techniques may equally be applied to a sized fiber product in the absence of a matrix to remove fiber sizing material from the reinforcing fibers. As such, references below to a fiber-reinforced composite are equally applicable to a sized fiber product in the absence of a matrix and reference to a matrix material are equally applicable to fiber sizing material.

In the generalized processing shown in FIG. 1, a feed of a fiber-reinforced composite 102 is subjected to first treating 104 during which the composite 102 is contacted with a first solvent 106 under conditions to dissolve into the first solvent 106 at least a majority by weight of the matrix of the composite 102. Rich first solvent 108 including dissolved material of the matrix from the first treating 104 may be recovered and processed as desired, for example to recover material of the matrix and prepare lean first solvent for recycling back to the first treating 104 as part of the first solvent 106 feed. A result of the first treating is first treated solid residue 110, at least a portion of which is subjected to second treating 112. The first treated solid residue 110 includes the reinforcing fibers freed from the matrix of the composite 102, but still in the presence of residual first solvent. During the second treating 112, at least a portion of the first treated solid residue 110, and preferably all or essentially all of the first treated solid residue 110, is contacted with a second solvent 114. Rich second solvent 116 containing dissolved first solvent 106 that is removed from the presence of the first treated solid residue 110 during the second treating 112 may be recovered from the second treating 112 and processed as desired. The second solvent 114 may also dissolve some of and/or carry away some particulates of residual material of the matrix that may remain in the first treated solid residue 110 following the first treating 104. A result of the second treating 112 is a second treated solid residue 118 that has been cleansed of at least a portion, and preferably essentially all, residual first solvent 106 associated with the first treated solid residue 110 following the first treating, and preferably the second treated solid residue 118 also has been cleansed of at least a portion of residual material of the matrix that may remain in the first treated solid residue 110 following the first treating 104. Preferably, the second treated solid residue 118 is made up almost entirely of reinforcing fibers, although such reinforcing fibers may still be associated with a small residual amount of matrix material and and/or some fiber sizing material in the form of a thin coating on the reinforcing fibers when the reinforcing fibers are of a type that originally were protected by a coating of sizing material prior to manufacture of the composite 102.

With continued reference to FIG. 1, the first solvent 106 is a normally-liquid material (e.g., methylene chloride) with a significant solvating capacity for dissolving and carrying away material of the matrix from the composite 102, and the first solvent is contacted with the composite 102 under conditions of temperature and pressure at which the first solvent 106 is in a liquid form. In contrast, the second solvent 114 is a normally-gaseous material (e.g., carbon dioxide) that is contacted with the first treated solid residue 110 under conditions of temperature and pressure at which the second solvent 114 is in the form of a liquid or supercritical fluid. In some implementations, the second treated solid residue 118 may remain in a mixture with some of the second solvent 114, which may be beneficial for some further optional processing of the second treated solid residue, for example processing of a type as illustrated in FIG. 2 or 3, discussed below.

Figure 2:
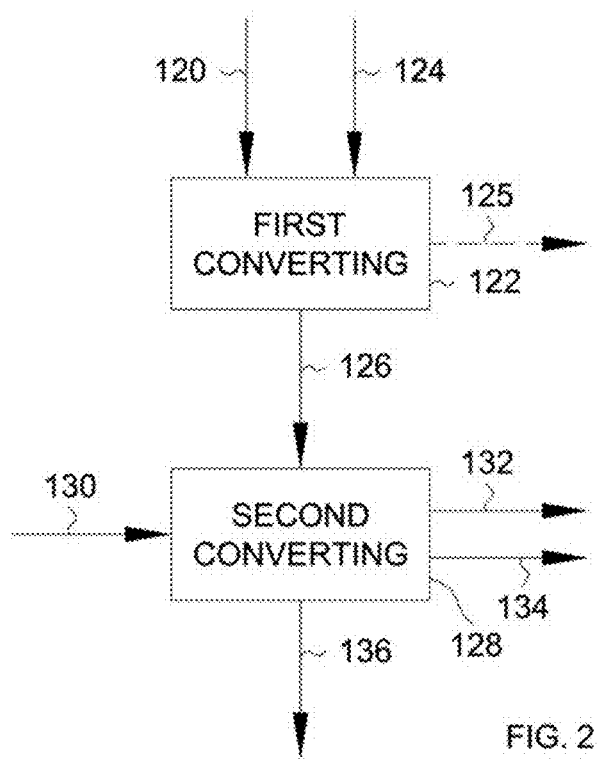
FIG. 2 is a generalized process block diagram illustrating another example of processing of an aspect of this disclosure.
Figure 3:
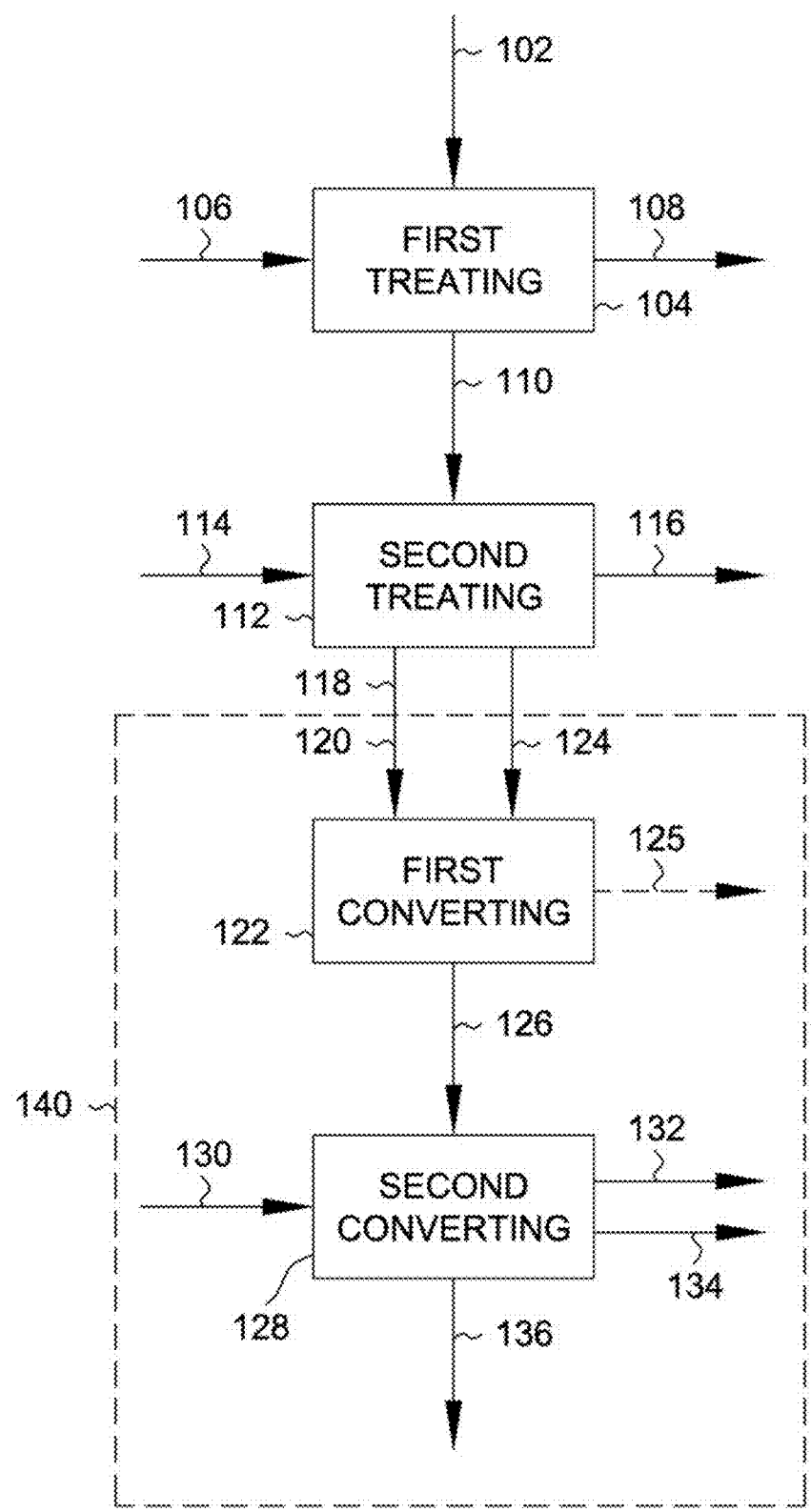
FIG. 3 is a generalized process block diagram illustrating another example of processing of an aspect of this disclosure.

Reference is now made to FIG. 2 which shows a generalized process block diagram illustrating some example implementations of a method for processing a crude product containing reinforcing fibers recovered from prior processing of a composite including the reinforcing fibers. As shown in FIG. 2, a feed of such a crude product 120 and a feed of a fluid form 124 of a normally-gaseous substance are subjected to a first converting step 122 in which, in the presence of the crude product, the normally-gaseous substance is converted from the fluid form 124 (i.e., liquid, gas or supercritical fluid) to a solid form in contact with the crude product. The feed of the crude product 120 preferably is made up mostly of freed reinforcing fibers, but may typically include some residual matrix material and/or fiber sizing material. During the first converting step 122, the temperature of the normally-gaseous substance is reduced, which may accompany a change in pressure of the normally-gaseous substance. In an example implementation, the first converting step may involve gas expansion cooling associated with reducing the pressure of the normally-gaseous substance from a high-pressure state to a low-pressure state. For example, during the first converting step 122 a mixture of the crude product and the normally-gaseous substance may be initially contained in a pressure vessel with the normally-gaseous substance under very high pressure in a form of a high pressure gas, liquid or supercritical fluid. The pressure vessel may then be depressurized through venting of a portion, or even most, of the normally-gaseous substance as a vent stream 125 from the pressure vessel at a sufficiently rapid rate to reduce the temperature within the pressure vessel to a temperature at which at least a portion of the normally-gaseous substance initially in the pressure vessel is cooled sufficiently to convert to a solid form in contact with the crude product in the depressurized pressure vessel. Such a vented portion of the normally-gaseous substance is illustrated in FIG. 2 by a vent stream 125 shown as a dashed line.

A result of the first converting 122 is a mixture 126 including the crude product and the solid form of the normally-gaseous substance. Preferably, such solid form is present in void spaces in and around residual matrix material and fiber sizing material, and with a portion of the solid form impregnating the residual matrix material and fiber sizing material. Such impregnation may result from penetration, such as by diffusion, of the fluid form of the normally-gaseous substance into such residual matrix material and fiber sizing material, with some of such penetrating fluid then converting to the solid form within the matrix material and fiber sizing material as the pressure and temperature are reduced.

After the first converting step 122, the mixture 126 including the crude product and the solid form of the normally-gaseous substance is subjected to a second converting step 128, during which the normally-gaseous substance of the mixture 126 is converted from the solid form into a gaseous form, and preferably at a very rapid rate. In that regard, the second converting step 128 may include rapid sublimation of the solid form to the gaseous form. During the second converting step 128 as illustrated in FIG. 2, heat is supplied to rapidly convert the solid form of the normally-gaseous substance to a gaseous form by contacting the mixture 126 with a heat transfer fluid 130. This may be accomplished in any way to quickly warm the mixture 126. In the example illustrated in FIG. 2 the heat is supplied by contacting the mixture 126 with the heat transfer fluid 130 that is at a higher temperature than the temperature of the mixture 126. As shown in FIG. 2, a feed of a heat transfer fluid 130 is fed to the second converting to contact and warm the mixture 126 and cause conversion of the solid form of the normally-gaseous substance to the gaseous form. Such a feed of heat transfer fluid 130 may be, for example, in the form of a liquid (e.g., heated water, heated oil), a gas (e.g., steam, carbon dioxide, nitrogen), or multiphase (e.g., saturated steam/water mix). In the example shown in FIG. 2, effluent 132 of the normally-gaseous substance in gaseous form and effluent 134 of the heat transfer fluid are removed from the second converting 128, and may be recovered separately or in a mixture from the second converting 128. A cleaned product 136 is recovered from the second converting 128. The cleaned product 136 includes the reinforcing fibers cleaned of at least a portion of residual material of the matrix and/or sizing material that were present in the feed of the crude product 120. Particles of dislodged matrix material and/or sizing material may be recovered with effluent 132 of the normally-gaseous substance and/or the effluent 134 of the heat transfer fluid. The feed of the crude product 120 to the processing of FIG. 2 may result from any prior processing. In some implementations, the crude product 120 that is fed to the processing of FIG. 2 may be provided by first treated solid residue 110 or second treated solid residue 118 prepared in the processing shown in FIG. 1.

FIG. 3 is a generalized process block diagram illustrating some example implementations of processing including the first treating 104 and second treating 112 of FIG. 1 combined with third treating 140 including the first converting 122 and the second converting 128 of FIG. 2, in which second treated solid residue 118 from the second treating 112 is used as the feed of crude product 120 for the first converting 122. The same reference numerals are used in FIG. 3 to refer to like features shown in and described in relation to FIGS. 1 and 2, except as stated otherwise. In the processing of FIG. 3, a portion of the second solvent 114 from the second treating 112 is used as the feed of the fluid form 124 of a normally-gaseous substance to the first converting 122. Such feed of the fluid form 124 of a normally-gaseous substance may be, for example, relatively clean fluid following flushing out most of the residual first solvent 106 from the first treated solid residue 110 during the second treating 112, which is recovered in the rich second solvent 116. In the example processing of FIG. 3, the first treating 104, second treating 112, first converting 122 and the second converting 128 may be as described previously with reference to FIGS. 1 and 2.

In the processing shown in FIGS. 1 and 3, the first treating 104 and second treating 112 may be performed in a single process vessel or may be performed in separate process vessels. The first treating 104 may be performed in a liquid containment vessel that need not be a pressure vessel, whereas the second treating 112 will typically be performed in a pressure vessel. The first treating 104 and second treating 112 may be performed in a batch, continuous or semi-continuous operation. In the processing of FIGS. 2 and 3, the first converting 122 and the second converting 128 will each typically be performed in a pressure vessel, and which may be in a single pressure vessel or in separate pressure vessels. The first converting 122 and the second converting 128 may be performed in a batch, continuous or semi-continuous operation. For continuous or semi-continuous processing, the first converting 122 and second converting 128 will typically be performed in separate pressure vessels. For batch processing, the first converting 122 and second converting 128 may conveniently be performed in a single pressure vessel.

Figure 4:
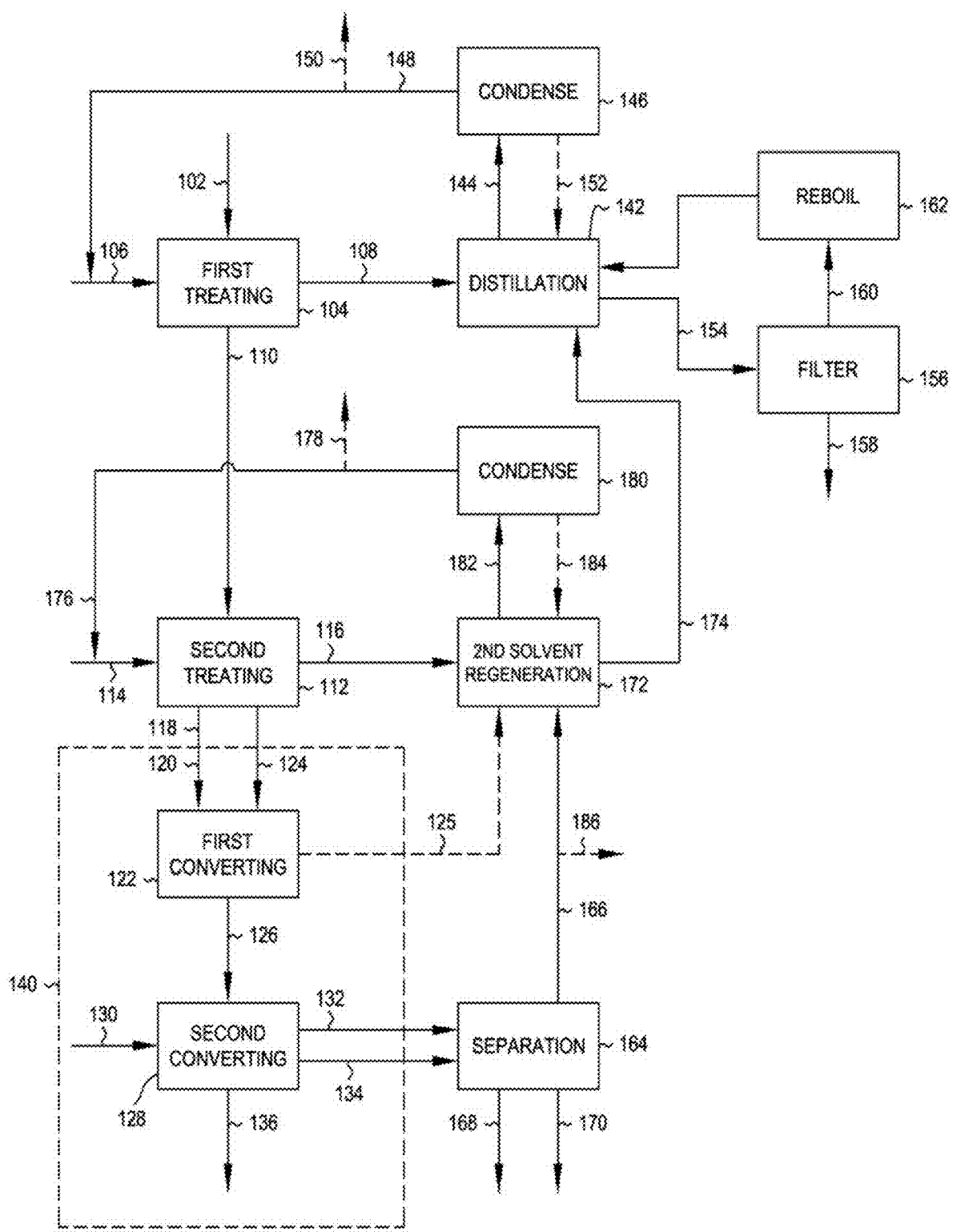
FIG. 4 is a generalized process block diagram illustrating another example of processing of an aspect of this disclosure.

FIG. 4 is a generalized process block diagram showing the same example processing as shown in FIG. 3, but also illustrating examples of some ancillary processing to treat rich first solvent 108 to recover matrix material, to recycle lean first solvent for reuse and to regenerate second solvent. The same reference numerals are used in FIG. 4 to identify like features as are shown and described in relation to FIGS. 1-3. In the example processing shown in FIG. 4, the rich first solvent 108 is subjected to distillation 142 to remove dissolved matrix material and to regenerate clean first solvent for reuse. During the distillation 142, overhead including first solvent vapor 144 is collected and subjected to a condensing operation 146 to condense first solvent vapor and prepare regenerated lean first solvent 148 in liquid form that may be recycled for use to prepare additional feed of the first solvent 106 to the first treating 104. FIG. 4 also shows an optional bleed 150 to remove first solvent as needed. Optionally, some condensed first solvent 152 may be returned to the distillation 142 as reflux. Distillation bottoms 154 containing liquid first solvent and precipitated material of the matrix are subjected to a filtration operation 156. A retentate portion 158 including precipitated solids of the matrix material is recovered and a filtrate portion 160 is subjected to a re-boil 162 to vaporize first solvent for return to the distillation 142.

The effluent 132 of the normally-gaseous substance (second solvent) and the effluent 134 of the heat transfer fluid from the second converting 128 are processed in a separation operation 164. The effluents 132 and 134 may be partly or entirely in a combined stream. In the separation operation 164, second solvent may be flashed from the heat transfer fluid to prepare recovered normally-gaseous substance 166 and solids (e.g., of matrix material and/or fiber sizing) may be filtered from the heat transfer fluid to prepare recovered heat transfer fluid 168 and recovered solids 170. The vent 125 of normally-gaseous substance (second solvent) from the first converting 122, the recovered normally-gaseous substance 166 and the rich second solvent 116 may be processed through a second solvent regeneration operation 172. A bleed 186 of second solvent may optionally remove second solvent from the system as needed. In the second solvent regeneration operation 172, first solvent 106 dissolved in the rich second solvent 116 may be recovered as a recovered first solvent 174, such as by distillation of the rich second solvent 116 to convert the rich second solvent 116 to a gas form and to precipitate first solvent. During the second solvent regeneration operation 172, overhead including second solvent vapor 182 is collected and subjected to a condensing operation 180 to condense second solvent vapor and prepare regenerated lean second solvent 176 in liquid form that may be recycled for use to prepare additional feed of the second solvent 114 to the second treating 112. FIG. 4 also shows an optional bleed 178 to remove second solvent as needed. Optionally, some condensed second solvent 184 may be returned to the second solvent regeneration 172 as reflux. The recovered first solvent 174 may be further processed in the distillation 142.

The foregoing discussion describes embodiments for recovery of reinforcing fibers from a fiber-reinforced composite without regard to the form in which the fiber-reinforced composite or the reinforcing fibers are provided. However, as recognized above, certain fiber-reinforced composites that are to be recycled for recovery and/or recycling of the reinforcing fibers may be provided in a continuous form. Examples of such continuous forms include, but are not limited to, continuous tow, unidirectional sheets, nonwoven fabric, woven fabric or any other form that may be provided with at least a portion of the reinforcing fibers in a continuous and/or specific arrangement. By continuous reinforcing fibers, it is meant that the reinforcing fibers are arranged to be continuous relative to a given dimension of the product. The continuous fibers may have a minimum length of at least about 1 m, at least about 5 m, at least about 10 m, at least about 25 m, at least about 50 m, or even at least about 100 m or more. While the continuous fibers may correspond in length with an overall fiber-reinforced composite to be recycled, the continuous fibers may be of a length longer or shorter than the overall fiber-reinforced composite length.

Such continuous forms of fiber-reinforced composites may include at least a portion of the reinforcing fibers of the fiber-reinforced composites as continuous reinforcing fibers. Moreover, continuous reinforcing fibers in a continuous form may also refer to the particular arrangement of the fibers. For example, fibers may be provided in a unitary sheet in which the reinforcing fibers are both continuous and arranged in a relatively uniform arrangement of fibers along a width of the continuous form transverse to the length of the continuous fibers. Furthermore, fibers provided as tow may have a particular bundling formation including predetermined twists or the like that may be desirably maintain during processing. In this regard, a continuous form of continuous reinforcing fibers may refer both to the continuity the fibers and or the arrangement of the fibers in the continuous form. Often times such continuous fiber-reinforced composite to be recycled includes prepreg rolls of unitary sheet, prepreg rolls of carbon fiber tow, or other continuous forms of prepreg material that have expired.

While such continuous reinforcing fibers could be cut and/or processed in a manner that does not maintain the continuous form of the reinforcing fibers, such processing may be disadvantageous as the continuous form of the reinforcing fibers may provide advantages in relation to manufacturing processes, resulting manufactured product properties, or the like. Moreover, once such reinforcing fibers are either cut or disrupted (e.g., tangled, frayed, or the like), it may be difficult or impossible to rearrange such fibers in a continuous form in a later processing step to retain the advantages of the original continuous form of the fibers. Accordingly, the following discussion includes embodiments that may allow for processing of continuous fiber-reinforced composite in accordance with the foregoing embodiments for processing to maintain the continuous reinforcing fibers of the continuous fiber-reinforced composite in continuous form. As the foregoing embodiments may include the processing described above, like numerals will be utilized in the following to refer to the foregoing processes.

One embodiment that may be used to process continuous fiber-reinforced composites may include a batch process in which the continuous fiber-reinforced composite is re-spooled from a source spool to a destination spool prior to undergoing processing. In turn, the destination spool of fiber-reinforced composite may undergo solvent-based processing as described above. In this regard, the destination spool and/or the manner in which the fiber-reinforced composite is spooled onto the destination spool may aid in the effectiveness of the solvent-based processing to be carried out on the spooled reinforcing fibers in the continuous form.

Figure 12:
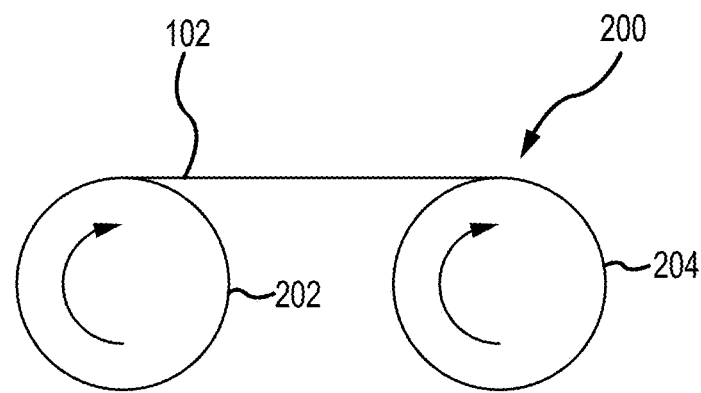
FIG. 12 is a schematic view of an embodiment of a source spool and a destination spool for transfer of continuous reinforcing fibers between the source spool and the destination spool.

For instance, with further reference to FIG. 12, an embodiment 200 for processing continuous fiber-reinforced composite 102 may include transferring the fiber-reinforced composite 102 from a source spool 202 to a destination spool 204. The destination spool 204 and/or the manner in which the continuous fiber-reinforced composite 102 is wound about the destination spool 204 may assist in facilitating processing of the continuous fiber-reinforced composite 102 on the destination spool 204. For instance, the source spool 204 may be a spool about which the fiber-reinforced composite 102 was provided for use in a manufacturing process. In this regard, the source spool 202 may be a cellulose-based material such as a paper-based spool that may include reinforced paperboard, cardboard, or the like. Such spool material may not provide desirable mechanical properties when exposed to the solvent-based processing described herein (e.g., the spool material may degrade or be destroyed), which may include subjecting the spool to contact with or submersion in solvent.

Accordingly, the source spool 202 may comprise a first material of construction and the destination spool 204 may comprise a second material of construction. The first material and the second material may differ. Specifically, the destination spool 204 may comprise a second material that may be suited for processing according to the solvent-based processing described herein. For instance, the second material may be compatible with the first solvent and the second solvent. Moreover, the second material may provide increased mechanical properties that may withstand the physical requirements for maintaining the physical integrity of the destination spool 204 during the solvent-based processing described herein. As an example, the second spool may be constructed from stainless steel or the like.

In addition, the destination spool 204 and/or the manner in which the continuous fiber-reinforced composite 102 is wound about the destination spool 204 may also assist in effective contacting of the spooled material with solvent as it is subjected to the solvent-based processing described herein. As may be appreciated, the fiber-reinforced composite 102 on the source spool 202 may be provided for use in a manufacturing process. The source spool 202 may include many layers of the continuous fiber-reinforced composite 102 such that penetration of a solvent to the inner layers of the spool may be difficult. Moreover, the fiber-reinforced composite 102 may also be spooled with additional material, such as backing material to prevent adhesion between layers or the like. In turn, the transfer of the fiber-reinforced composite 102 from the source spool 202 may remove any extraneous packaging material, reconfigure the spooled material about the designation spool 204, reduced the number of spooled layers, and/or dispose the fiber-reinforced composite 102 adjacent to features of the destination spool 204 that promote effective contact of the spooled fiber-reinforced composite 102 with a solvent.

Figure 13:
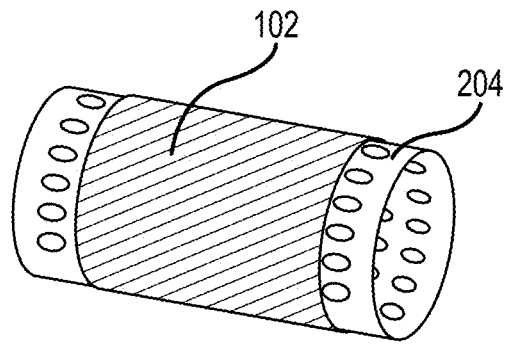
FIG. 13 is a perspective view of an embodiment of a destination spool having continuous fibers wound about the destination spool.

In an embodiment depicted in FIG. 13, the destination spool 204 may comprise a perforated cylindrical body about which the continuous reinforcing fibers of the continuous fiber-reinforced composite 102 are wound. This perforated cylindrical body may assist in effective contact between the continuous reinforcing fibers disposed about the destination spool 204 and a solvent when exposed to the solvent-based processing. Specifically, the perforated destination spool 204 may allow for flow of solvent through the fibers from both external to the spooled material and from within the spool to an exterior of the spooled material.

Additionally or alternatively, the manner in which the continuous reinforcing fibers are wound onto the destination spool may be in a manner different than that provided that the source spool 102. For instance, the fibers may be disposed on the source spool 202 in a given wind geometry. This wind geometry may include various parameters including the angle relative to the spool at which the fibers are wound about the spool, the spacing between adjacent fiber winds on the spool, or the like. In this regard, the wind geometry for the destination spool 204 may be different than that of the source spool 202. For instance, the destination spool 204 may comprise a hoop wind in which the fibers are relatively densely wound about the destination spool 204. That is, the angle at which the fibers are wound about the destination spool 204 may be nearly zero relative to a circumferential datum about the cylindrical body of the destination spool 204. In contrast, the source spool 202 may have a wind geometry with an angled wind in which the angle at which the fibers are wound relative to the circumferential datum is larger than that of a hoop wind to allow for improved stripping of the fibers from the spool.

In addition, to assist in promoting effective contact between the fibers on the destination spool 204 and a solvent, the continuous reinforcing fibers may be wound onto the destination spool 204 at a wind thickness with relatively few winding layers, for example no more than 100 layers. In this regard, the wind thickness refers to the number of layers of continuous fiber wound about the destination spool 204. It may be appreciated that providing fibers at too great a wind thickness may result in the inability to sufficiently penetrate to fibers in layers of the spool 204 (e.g., adjacent to the spool body or in a region between the exterior of the spool and an inner perforated wall of the spool) for effective solvent treatment of all material on the spool.

Further still, the destination spool 204 may differ with respect to the source spool 202 with regard to at least one spool dimension. The spool dimension may include a spool length or a spool diameter referring to the length and diameter of the spool body, respectively. In this regard, a larger spool length may be provided for the destination spool 204 to allow for acceptance of a larger amount of continuous fiber without unduly increasing the layer count of the fiber. The spool diameter of the destination spool may be larger than or smaller than the spool diameter of the source spool. In some implementations, the destination spool 204 may have a smaller diameter than the source spool 204 to permit processing of the destination spool 204 in a processing vessel of smaller diameter.

Figure 14:
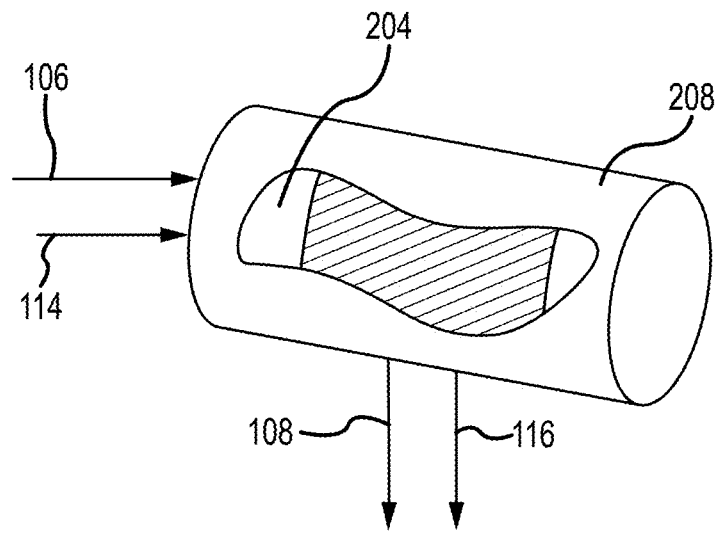
FIG. 14 is a partial schematic view of an embodiment of a process vessel, shown partially translucent for clarity of explanation, that may be used in treating continuous reinforcing fibers.

With further reference to FIG. 14, the destination spool 204 may be subjected to any or all of the solvent-based processing as described above. In this regard, the destination spool 204 about which the fiber-based composite 102 is wound may be disposed within a process vessel 208. The destination spool 204 may undergo processing according to the foregoing description such that a first solvent 106 may be introduced into the interior of the vessel 208 for contacting the fiber-reinforced composite 102 to perform a first treating 104 as described above. As a result, a first treated solid residue 110 may be disposed about the destination spool 204 at the conclusion of the first treating 104. Rich first solvent 108 may be removed from the vessel 208 for processing as described above. Second solvent 114 may be introduced to the vessel 208 to perform second treating 112. Accordingly, at the conclusion of the second treating 112, a second treated solid residue 118 may be disposed about the destination spool 204. Rich second solvent 116 may also be recovered from the vessel 208 after the second treating 112.

While FIG. 14 depicts a situation in which the first treating 104 and second treating 112 occurring in a single process vessel 208, it may be appreciated that the first treated solid residue 110 disposed about the destination spool 204 may be removed from a first process vessel after the first treating 104 and disposed in a second process vessel in which the second treating 112 may occur. That is, the first treating 104 may occur in a first process vessel and second treating 112 may occur in a second process vessel such that the destination spool 204 about which the continuous reinforcing fibers are disposed may be transferred from the first process vessel to a second process vessel between the first treating 104 and the second treating 112.

In addition, the second treated solid residue 118 disposed about the destination spool 204 at the conclusion of the second treating 112 may also be exposed to third treating 140. This may occur in either the process vessel 208, a second process vessel in which the second treating 112 occurred, or a third process vessel specific to the third treating 140. In addition, the second treated solid residue 118 disposed about the destination spool 204, with or without being exposed to the third treating, may also be contacted with a sizing material and/or resin material for further processing of the material. This may allow for resizing and/or generation of a finished fiber-reinforced composite material utilizing the second treated solid residue 118.

Figure 15:
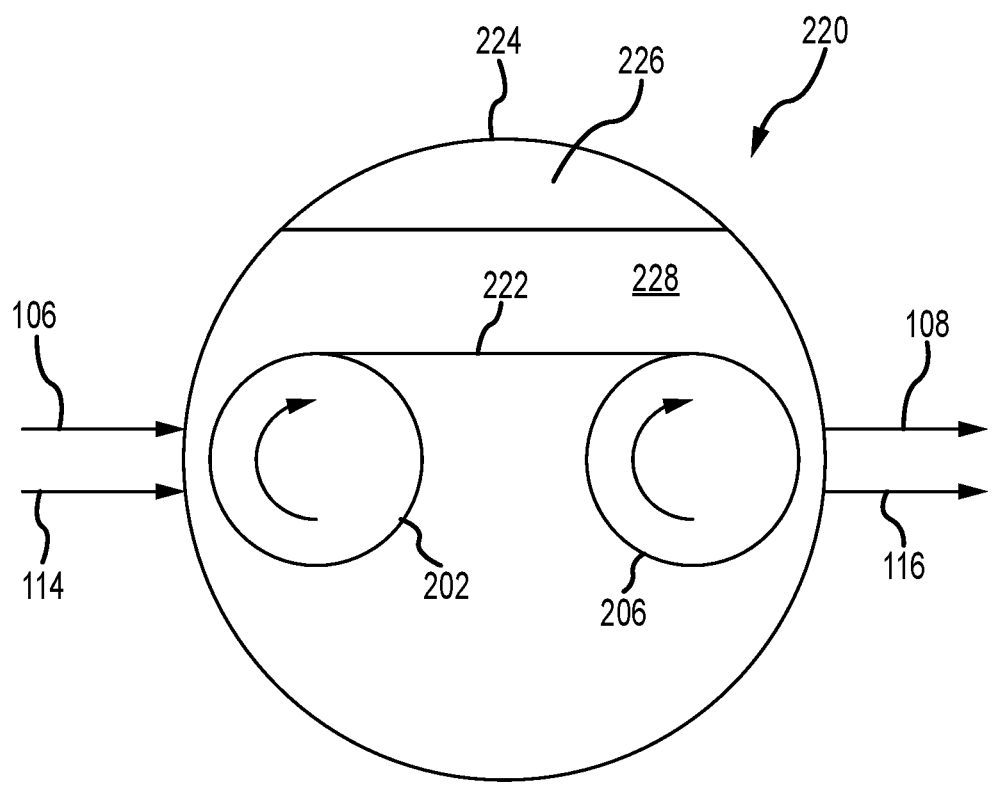
FIG. 15 is a schematic view of an embodiment for continuous processing of a web comprising reinforcing fibers transferred between a source spool and an intermediate spool in which the source spool, destination spool, and the web are immersed in a first bath of a first solvent.
Figure 16:
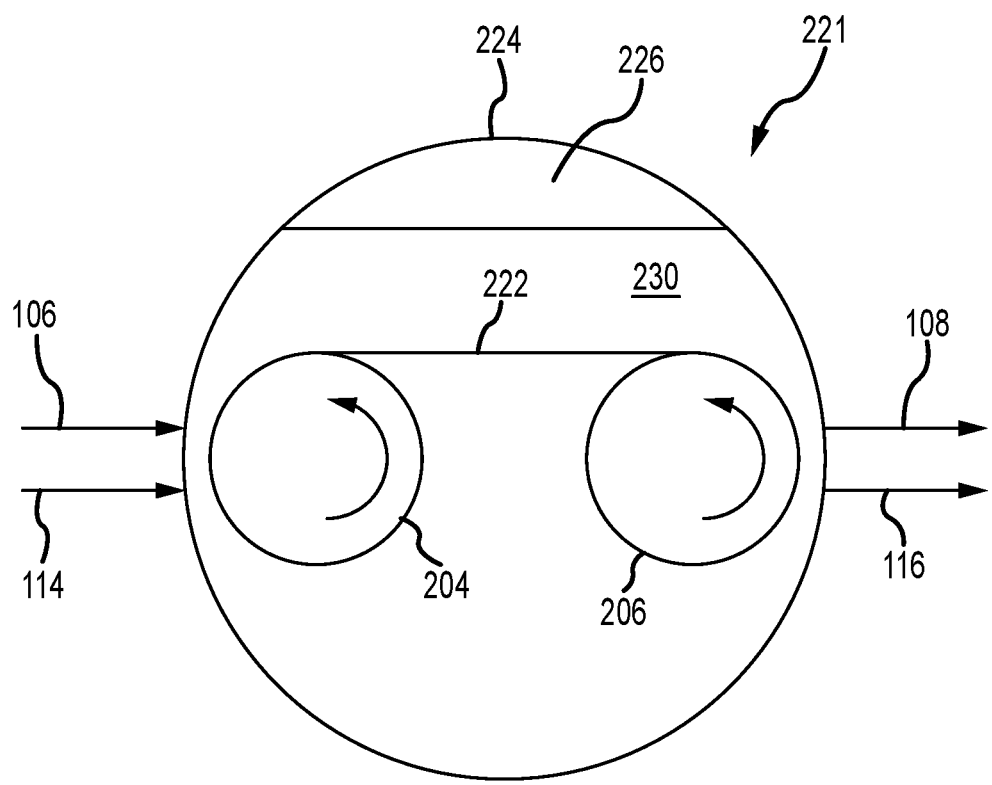
FIG. 16 is a schematic view of an embodiment for continuous processing of a web comprising reinforcing fibers transferred between an intermediate spool and a destination spool in which the source spool, destination spool, and the web are immersed in a first bath of a first solvent.

While FIGS. 12-14 describe a batch processing in which the destination spool 204 about which the continuous reinforcing fibers are disposed is exposed to the various solvent-based processing, in other embodiments 220 and 221 shown in FIGS. 15-16, the continuous reinforcing fibers may be exposed to various solvent-based processing in a spool-to-spool process. For instance, with further reference to FIG. 15, in the illustrated embodiment 220 a web 222 with continuous reinforcing fibers may extend from a source spool 202 to an intermediate spool 206. As the fibers are transferred between the source spool 202 and the intermediate spool 206, the fibers may be separated from the source spool 202 to define the web 222 extending between the source spool 202 and the intermediate spool 206. In turn, the web 222 may allow for improved contacting of the fibers with a solvent in the web 222 as the fibers are transferred between the source spool 202 and the intermediate spool 206.

Accordingly, the web 222 is intended to refer only to material suspended apart from a spool (e.g., the layer, portion, or strand of the continuous reinforcing fibers spanning between the source spool 202 and the intermediate spool 206). That is, the web 222 is not intended refer to any particular characteristics of the continuous reinforcing fiber such as interlinking between the fibers, multiaxial properties of the fibers, or the like. As such, the web 222 may be a unidirectional material (e.g., unidirectional sheet, unidirectional tow, etc.) that need not, but could in at least some embodiments, include multiaxial fiber within the web 222. In short, web 222 simply refers to the portion of the material being processed with the continuous fibers extending between the two given spools that is provided apart from any other spooled material.

As shown in FIG. 15, the first solvent 106 may be introduced into a process vessel 224 to provide a first solvent bath 228 of the first solvent 106. In turn, the source spool 202, web 222, and intermediate spool 206 may all be submerged in the first bath 228 to contact the web 222, the source spool 202, and the intermediate spool 206 to the first solvent 106. As may be appreciated, exposure of the web 222 to the first solvent bath 228 may improve contact between the reinforcing fibers in the web 222 and the first solvent 106. In addition, while the first solvent 106 may not penetrate all layers wound about the source spool 202, a certain number of exterior layers of the source spool 202 may be exposed to the first solvent 106 disposed in the first solvent bath 228. The web 222 may provide good contact between the reinforcing fibers and the first solvent 106 to promote effective treatment for preparing the first treated solid residue 110 by effectively and uniformly dissolving the matrix of the composite 102. In turn, the first treated solid residue 110 may be wound about the intermediate spool 206. The first treating 104 may comprise transferring the web 222 between the source spool 202 and the intermediate spool 206 such that at least the web 222 is exposed to the first solvent 106 to prepare the first treated solid residue 110.

Upon completion of the spooling of the fibers from the source spool 202 to the intermediate spool 206, rich first solvent 108 may be removed and recovered from the process vessel 224 as described above. With further reference to FIG. 16, in the illustrated embodiment 221 the second solvent 114 may be introduced into the process vessel 224 to create a second solvent bath 230 of the second solvent 114. The second solvent bath 230 may be introduced to the same process vessel utilized for the first treating 104, or the second solvent bath 230 may be introduced into a different process vessel than that used for the first treating 104, in which case the intermediate spool 206 may be transferred to the second process vessel prior to the second treating 212. In any regard, the fibers may be transferred between the intermediate spool 206 and a destination spool 204 such that a web 222 extending between the intermediate spool 206 and the destination spool 204 may be contacted by the second solvent 114 as the web 222 passes through the second bath 230 to prepare the second treated solid residue 118. The second solvent bath 230 may also contact the exterior layers of both the intermediate spool 206 and the destination spool 204 during the second treating 112. Rich second solvent 116 may be recovered from the process vessel 224 upon completion of the second treating 112. In addition, the vessel 224 may include a vapor space 226, which may be maintained at an elevated pressure at least in connection with the second treating 112 as described above.

In an embodiment, the destination spool 204 may be the same spool as the source spool 202. In this regard, during the first treating 104, the fibers may be transferred between the source spool 202 and the intermediate spool 206 in the presence of the first solvent bath 228. Thereafter, the fibers may be transferred between the intermediate spool 206 and the destination spool 204, which may be the same spool as the source spool 202.

Figure 17:
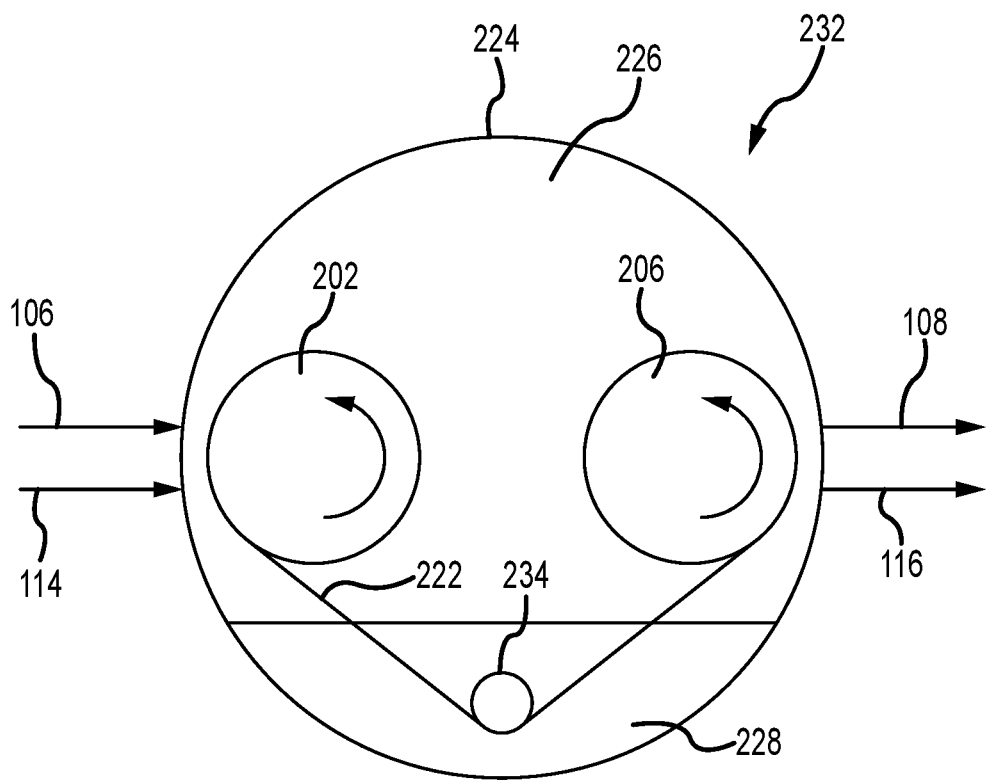
FIG. 17 is a schematic view of an embodiment for continuous processing of a web comprising reinforcing fibers transferred between a source spool and an intermediate spool in which the web travels along a path through a first bath of a first solvent.
Figure 18:
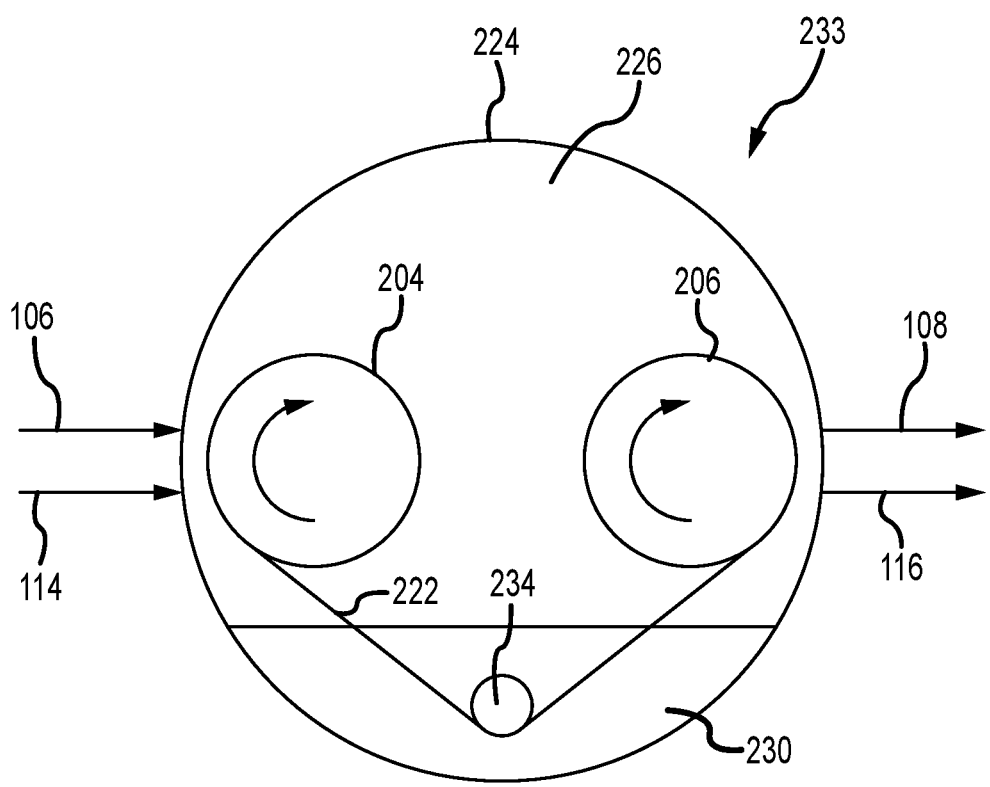
FIG. 18 is a schematic view of an embodiment for continuous processing of a web comprising reinforcing fibers transferred between an intermediate spool and a destination spool in which the web travels along a path through a second bath of a second solvent.

While the source spool 202, intermediate spool 206, and/or destination spool 204 may be disposed partially or entirely within the first solvent bath 228 and/or second solvent bath 230 for the respective first treating 104 and/or second treating 112, a portion of the web 222 alone may contact the respective solvent bath as shown in FIGS. 17 and 18. FIGS. 17 and 18 depict alternative embodiments 232 and 233, each of which utilizes a roller 234 to contact and guide the web 222 into either the first solvent bath 228 or the second solvent bath 230 for the respective first treating 104 and second treating 112. In this regard, the spools between which the fibers are transferred may be provided within the vapor space 226 of the vessel 226 to isolate the spools from the solvent baths. As such, the first treating 104 and/or second treating 112 may occur only with respect to the portion of the web 222 that follows the path through the respective solvent bath as shown in FIGS. 17 and 18. The roller 234 may also apply a desired tension to the web 222.

Figure 19:
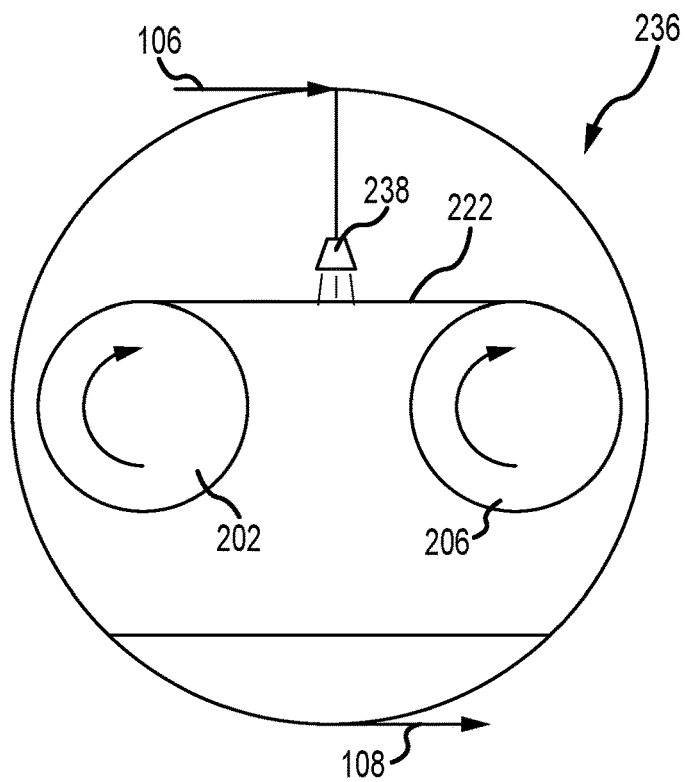
FIG. 19 is a schematic view of an embodiment for continuous processing of a web comprising reinforcing fibers transferred between a source spool and an intermediate spool in which the web is contacted with a continuous spray of a first solvent.
Figure 20:
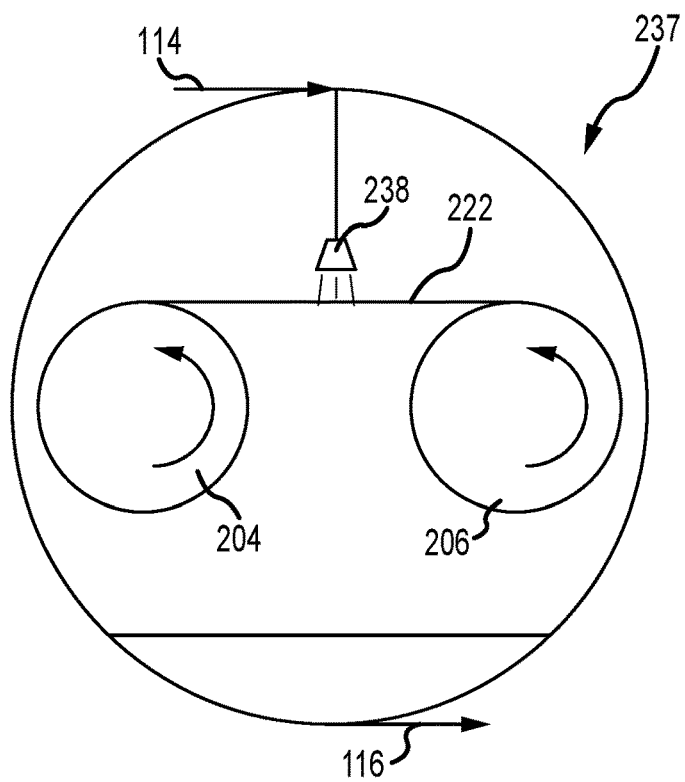
FIG. 20 is a schematic view of an embodiment for continuous processing of a web comprising reinforcing fibers transferred between an intermediate spool and a destination spool in which the web is contacted with a continuous spray of a second solvent.

With further reference to FIGS. 19 and 20, other embodiments 236 and 237 are depicted in which a web 222 extending between spools may be exposed to respective solvents of the first treating 104 and second treating 112 by a continuous spray 238 of the respective solvent. That is, the web 222 may be sprayed by a sprayer 238 with a spray of the first solvent 106 when being transferred between the source spool 202 and the intermediate spool 206 as shown for the embodiment 236 in FIG. 19. In turn, rich first solvent 108 may be recovered from the vessel 224. As shown for the embodiment 237 in FIG. 20, upon transferring the web 222 between the intermediate spool 206 and the destination spool 204, the second solvent 114 may be sprayed on the web 222 by the sprayer 238 to contact the web 222. As may be appreciated, the sprayer 238 may provide sufficient flow to effectively contact the web 222 for sufficient solvent contact for either the first treating 104 or the second treating 112.

In this regard, rather than contacting the web 222 with a solvent bath by guiding the web 222 into the solvent bath or submersion of the web and/or spools into a solvent bath, the web 222 may be contacted by the respective solvent for the first treating 104 or second treating 112 by the sprayer 238. It may be appreciated that utilization of the sprayer 238 may allow for a reduced volume of solvent as compared to the solvent baths. This may be particularly useful for larger formats of continuous fiber such as uni-directional sheets or the like. Furthermore, the mechanical action of the spray passing over the web 222 may assist in removal of matrix and/or solvent from the web 222. Moreover, utilization of the sprayer 238 may not require rollers and/or spools to disposed within the solvents, which may provide simplified mechanical designs for the embodiment 236.

Figure 21:
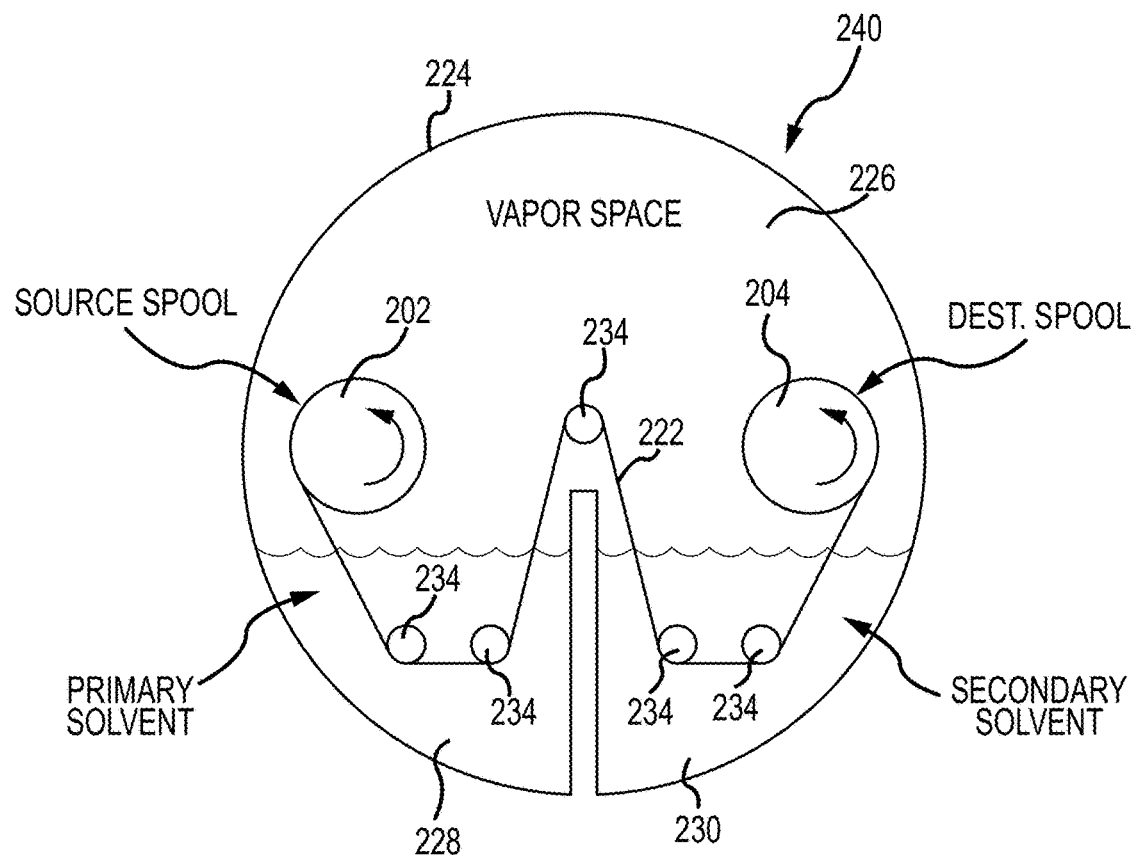
FIG. 21 is a schematic view of an embodiment for continuous processing of a web comprising reinforcing fibers transferred between a source spool and a destination spool in which the web is in contact with a first bath of a first solvent and a second bath of a second solvent.

While the foregoing embodiments contemplated utilization of an intermediate spool 206 that provides for multiphase processing in which the first treating 104 and second treating 112 are conducted in separate phases on a web 222 extending between, in a first stage, the source spool 202 and an intermediate spool 206, and, in a second stage, the intermediate spool 206 and the destination spool 204, a single phase process may be applied to the web 222 extending between the source spool 202 and destination spool 204 as shown in FIG. 21. In a contemplated processing alternative, the processing with immersion of the web 222 in a solvent bath, such as illustrated in FIGS. 17 and 18, may be combined with spray contacting with a solvent, such as illustrated in FIGS. 19 and 20. For example, pretreatment of the web 222 with a solvent spray may precede immersion in a solvent bath and/or post treatment of the web 222 with a solvent spray may follow immersion in a solvent bath.

FIG. 21 depicts an embodiment 240 in which a vessel 224 may include both a first solvent bath 228 of the first solvent 106 and a second solvent bath 230 of the second solvent 114. A web 222 with the continuous reinforcing fibers may extend between the source spool 202 and the destination spool 204 along a path such that the web 222 is disposed in the first solvent bath 228 and the second solvent bath when transferred between the source spool 202 and the destination spool 204. Specifically, the web 222 may be guided by a plurality of rollers 234 such that the web 222 follows a path such that the web 222 passes through the first solvent bath 228 and the second bath 230. The first solvent bath 228 and second solvent bath 230 may be physically isolated from one another by the mechanical configuration of the vessel 224. In addition, the vessel 224 may be at an elevated pressure (e.g., by pressurization of the vapor space 226). This may be provided to maintain the normally-gaseous second solvent 114 in liquid or supercritical fluid form as described above.

Figure 22:
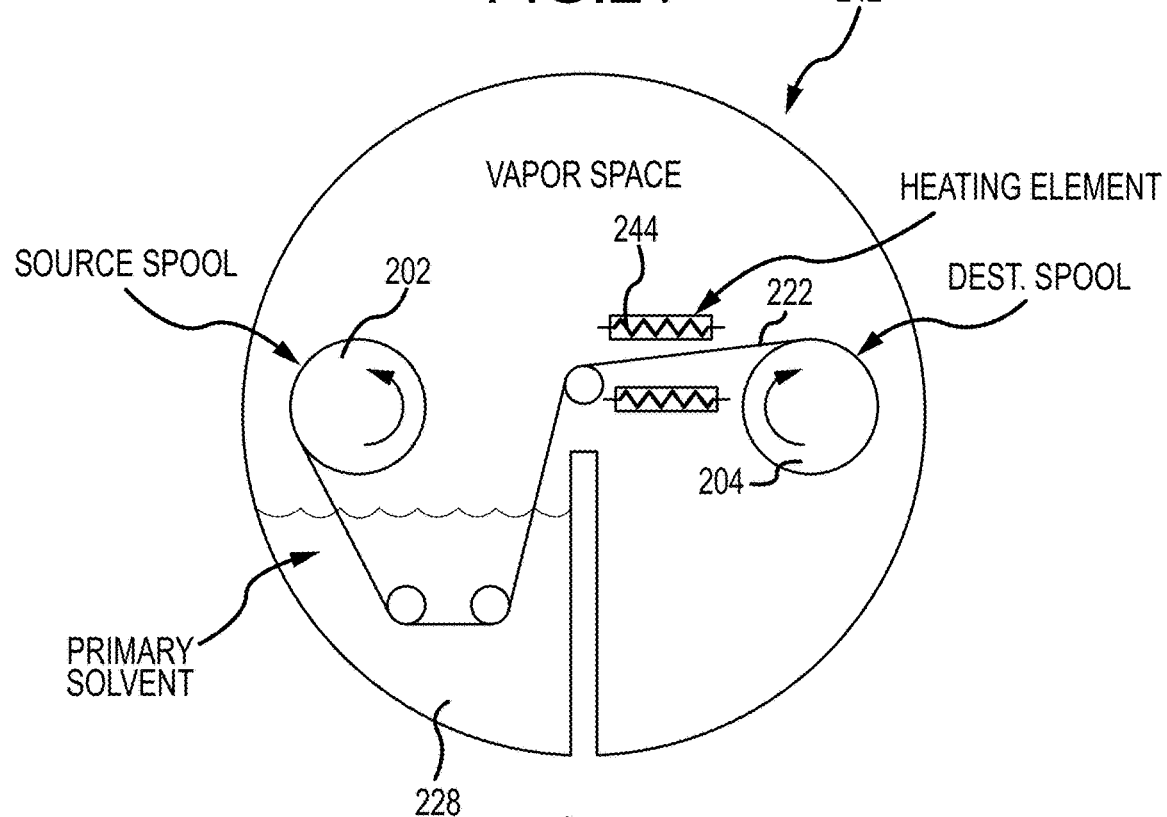
FIG. 22 is a schematic view of an embodiment for continuous processing of a web comprising reinforcing fibers transferred between a source spool and a destination spool in which the web is in contact with a first bath of a first solvent and is passed in relation to a heating element for removal of the first solvent from the web.

In an alternative embodiment 242 depicted in FIG. 22, the web 222 may pass relative to a heating element 244 after being exposed to the first solvent bath 228. The heating element 244 may be at a temperature greater than a volatilization temperature of the first solvent 206. In turn, when the web 222 passes relative to the heating element 244, the first solvent 206 may be at least partially removed from the web 222. In this regard, use of the heating element 244 may be used in lieu of or in addition to treatment with a second solvent 114 for removal of the first solvent 106 from the reinforcing fibers of the web 222. In any regard, the heating element 244 may be at a temperature lower than a pyrolysis temperature for the material of the matrix of the fiber-reinforced composite. That is, the heating element 244 may not result in pyrolysis, but may simply be provided to assist in volatilization of the first solvent 106 remaining in the web 222 after contacting in the first solvent bath 228 for removal of the solvent 106 from the web 222.

Figure 23:
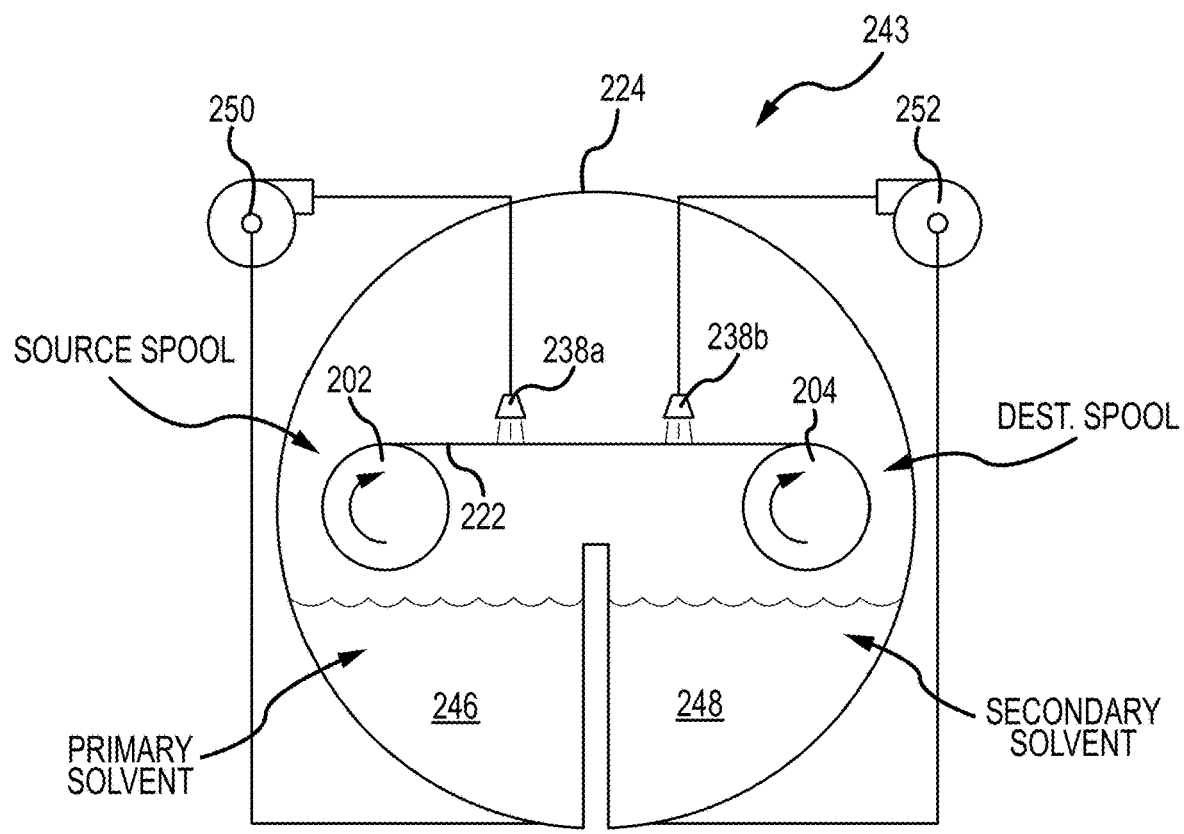
FIG. 23 is a schematic view of an embodiment for continuous processing of a web comprising reinforcing fibers transferred between a source spool and a destination spool in which the web is contacted with a continuous spray of a first solvent and a continuous spray of a second solvent.

With further reference to FIG. 23, a further embodiment 243 is shown in which a plurality of sprayers 238a and 238b may be utilized in a single-phase spool-to-spool approach for sequentially contacting the web 222 extending between the source spool 202 and the destinations full 204 with first solvent 106 and second solvent 114, respectively. The vessel 224 may comprise a first solvent reservoir 246 and a second solvent reservoir 248. A first solvent pump 250 may be provided to provide a pressurized supply of the first solvent 106 from the first solvent reservoir 246 to the first spray head 238a. A second solvent pump 252 may be provided to provide a pressurized supply of the second solvent 114 from the second solvent reservoir 248 to the second spray head 238b. In any regard, the first solvent 106 and second solvent 114 may of the applied to the web 222 in a single process operation as the web 222 spans between the source spool 202 and the destinations spool 204, thus realizing the benefits of the spray processing as described above.

Figure 24:
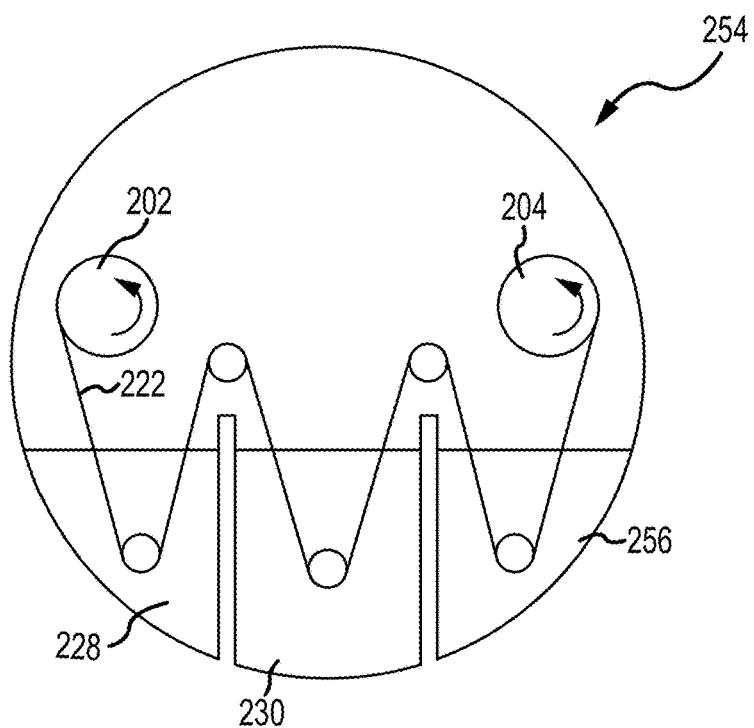
FIG. 24 is a schematic view of an embodiment for continuous processing of a web comprising reinforcing fibers transferred between a source spool and a destination spool in which the web is in contact with a first bath comprising a first solvent, a second bath comprising a second solvent, and a third bath.

With further reference to FIG. 24, an embodiment 254 is shown in which the web 222 extending between the source spool 202 and the destination spool 204 is also exposed to a third bath 256 that may comprise resin material and/or sizing material for application of sizing and/or resin material to the webbing 222 prior to spooling about the destinations spool 204. This may allow for treatment of the second treated solid residue from the second solvent bath 230 to be resized and/or provided with a resin prior to spooling about the destination spool 204. Such processing may include passing the fluid treated web 222 through a heating zone (e.g., using heating element 244) to remove residual liquid components prior to winding about the destination spool 204. As may be appreciated, in the embodiments illustrated in FIGS. 21, 23 and 24, the first treating with the first solvent and the second treating with the second solvent will be performed at the same pressure, which may be at the higher pressure as described above for the second treating to maintain the second solvent in a liquid or supercritical fluid form.

It may be appreciated that the forgoing embodiments may allow for solvent-based processing of the continuous reinforcing fibers of a fiber-reinforced composite such that the continuous reinforcing fibers are maintained in a continuous form. Maintaining a tensile force on the fibers during processing (e.g., on the web 222) may assist in preventing the fibers from tangling and/or fraying. In any of the foregoing embodiments, a tensile force of about 20 N may be maintained on the fibers during the processing.

EXAMPLES

The following examples further illustrate and describe various aspects of this disclosure.

Samples of 14002-D carbon fiber unidirectional prepreg composite (Rock West Composites) are subjected to testing for different processing combinations for recovery of carbon fibers for recycling. 14002-D is a fiber-reinforced composite prepreg including PYROFIL® TR50S carbon fibers (Mitsubishi Rayon Co., LTD) in a matrix of Newport 301 epoxy resin (Mitsubishi Rayon Carbon Fiber & Composites, Inc., formerly Newport Adhesives and Composites, Inc.). Test samples of 14002-D are pieces about 15×2.5 centimeters in size and weighing about 0.8 gram that are cut from sheets of 14002-D. Testing is performed on samples in a tubular test vessel with an internal fluid containment volume of about 0.25 liters and that is designed to withstand high pressures. In the examples described below, reference to a sample refers to sample solids being subjected to test processing, and may for example refer to an initial sample of the 14002-D prepreg composite at the commencement of testing or to a carbon fiber-containing solid residue at some point later during testing. Testing includes one or more of the following processing steps performed in the test vessel:

Solvent wash (SW): Sample is immersed in a bath of methylene chloride solvent, generally at room temperature, for a residence time of about 15 minutes, to dissolve material of the matrix from the sample, after which the methylene chloride solvent with dissolved matrix material is removed from the test vessel.

Liquid $CO_2$ rinse ($LCO_2$): Sample is immersed in liquid carbon dioxide at a pressure of about 5.5 MPa and a temperature of about 18° C. for a residence time of about 57 minutes.

Supercritical $CO_2$ rinse ($SCCO_2$): Sample is immersed in supercritical carbon dioxide at a pressure of about 10 MPa and temperature of at least 31.1° C. (critical temperature) for a residence time of about 5 minutes.

Hot water rinse (HWR): Sample is rinsed with hot tap water (temperature about 60° C. to 75° C.) that is introduced into the test vessel and is left in contact with the sample for about 5 minutes.

Rapid $CO_2$ sublimation (RSub): Following a $CO_2$ rinse (a liquid $CO_2$ rinse in the examples presented here), the test vessel is rapidly depressurized from a high pressure to essentially ambient pressure by rapid venting of carbon dioxide, which is accompanied by production of solid carbon dioxide in the test vessel in presence of the sample due to gas expansion cooling. Following depressurization of the test vessel, the sample in the presence of the solid carbon dioxide is subjected to a hot water rinse (same procedure as HWR described above) to rapidly sublimate the solid carbon dioxide.

Table 1 summarizes processing steps performed in each of 7 examples, with the processing steps listed in the sequence of performance in the test vessel for each of the examples. For convenient reference, the processing steps are identified by the abbreviated designations provided above in parentheses.

TABLE 1

| Example No. | SW | HWR | $LCO_2$ | $SCCO_2$ | RSub | $LCO_2$ | RSub |
|---|---|---|---|---|---|---|---|
| 1(B) | x | | | | | | |
| 2(C) | x | x | | | | | |
| 3(D) | x | | x | | | | |
| 4(L) | x | | | x | | | |
| 5(F) | x | | x | | x | | |
| 6(G) | x | | x | | | x | x |
| 7(H) | x | | x | | x | x | x |

Figure 5:
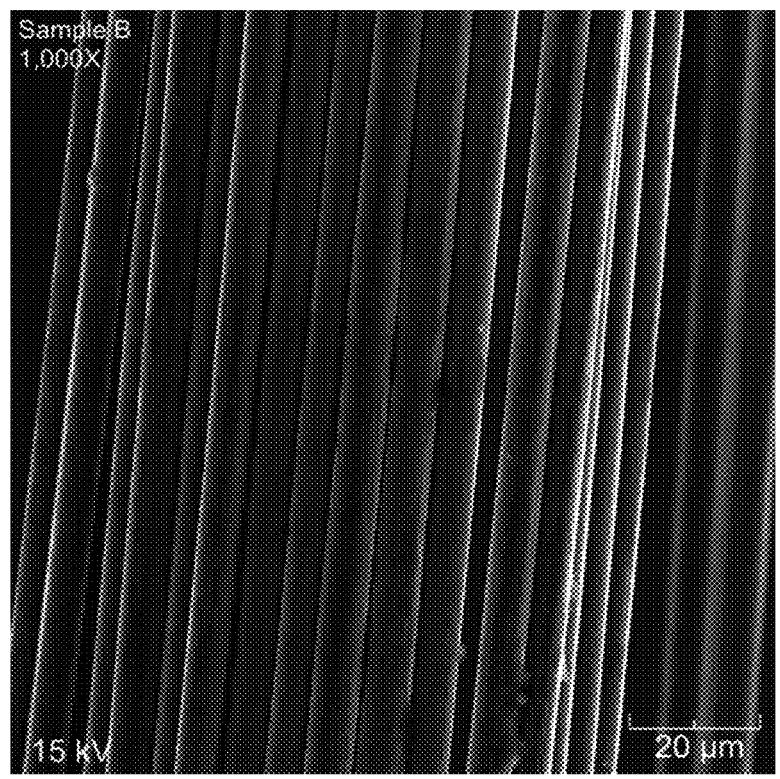
FIGS. 5-11 are SEM images of recovered carbon fibers from Examples 1-11, respectively, presented below.
Figure 6:
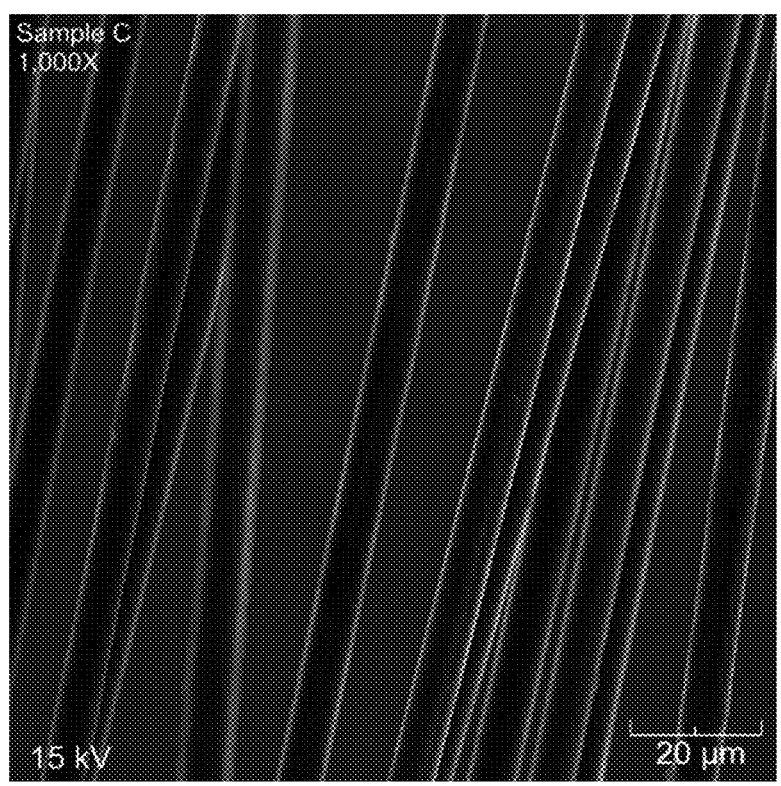
Figure 7:
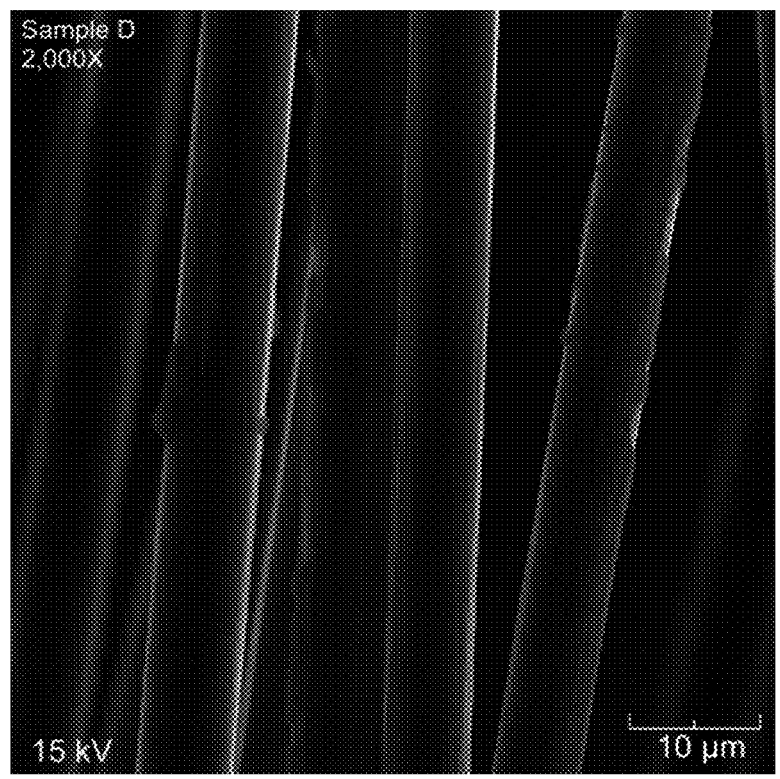
Figure 8:
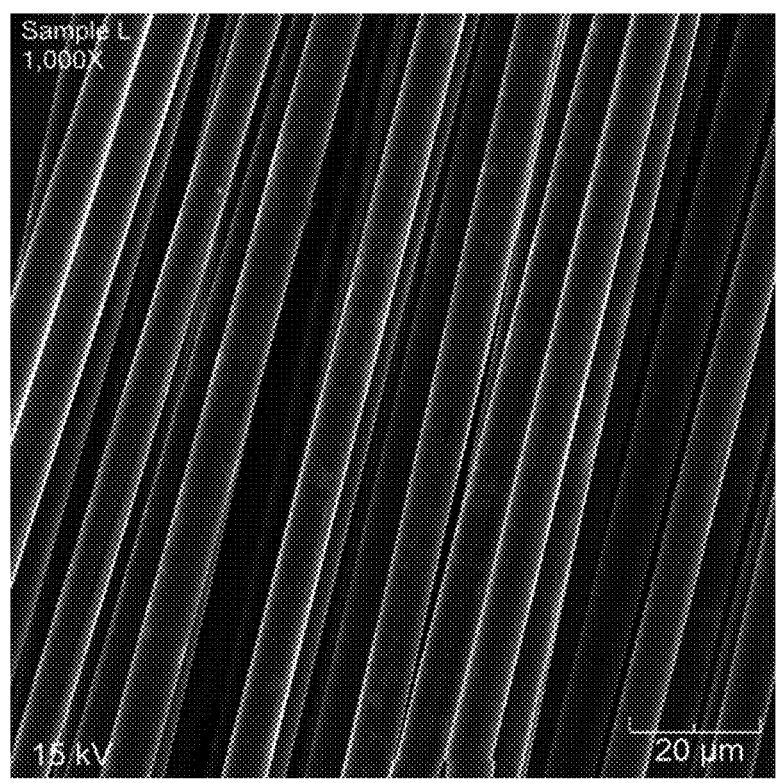
Figure 9:
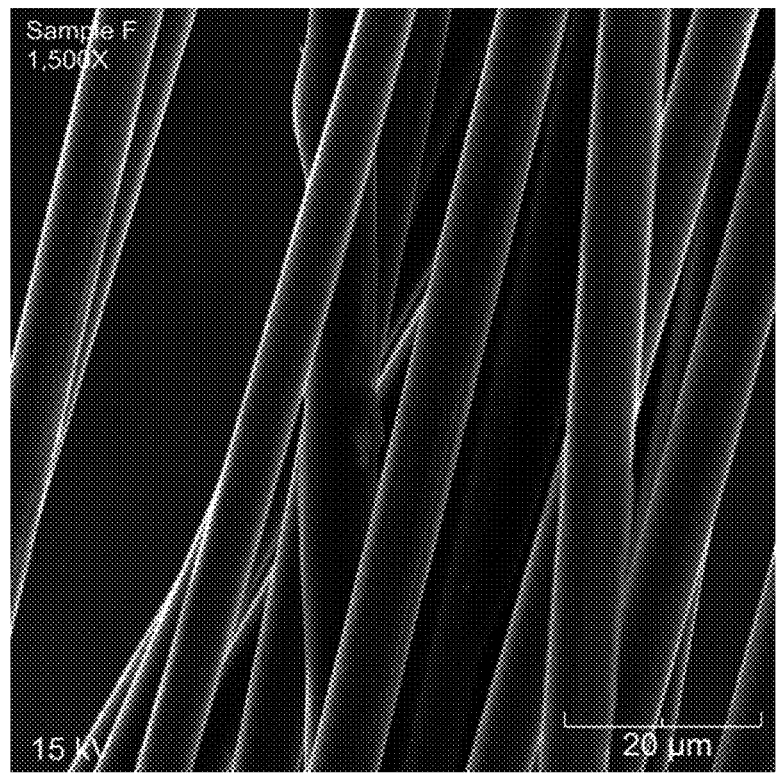
Figure 10:
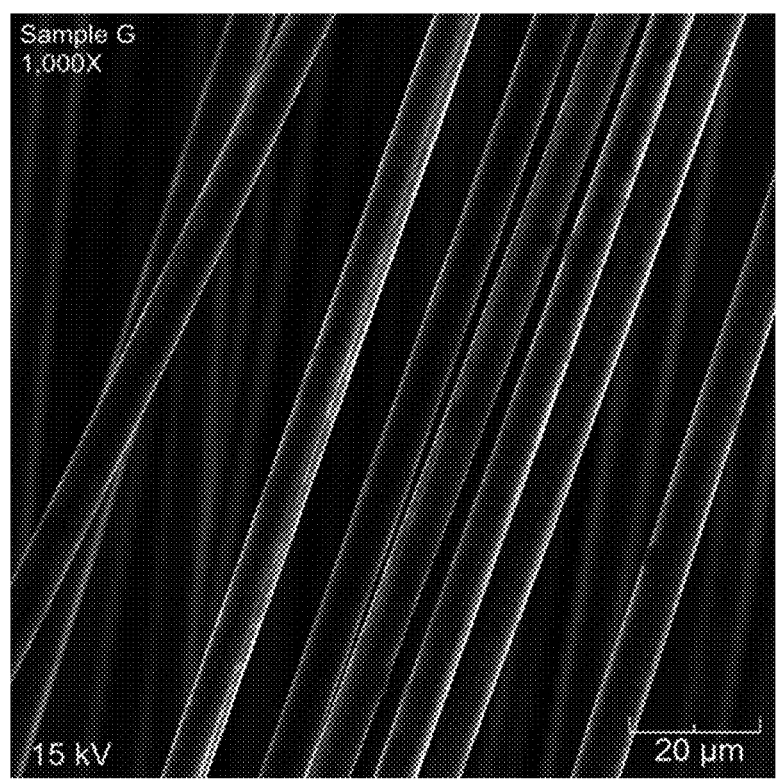
Figure 11:
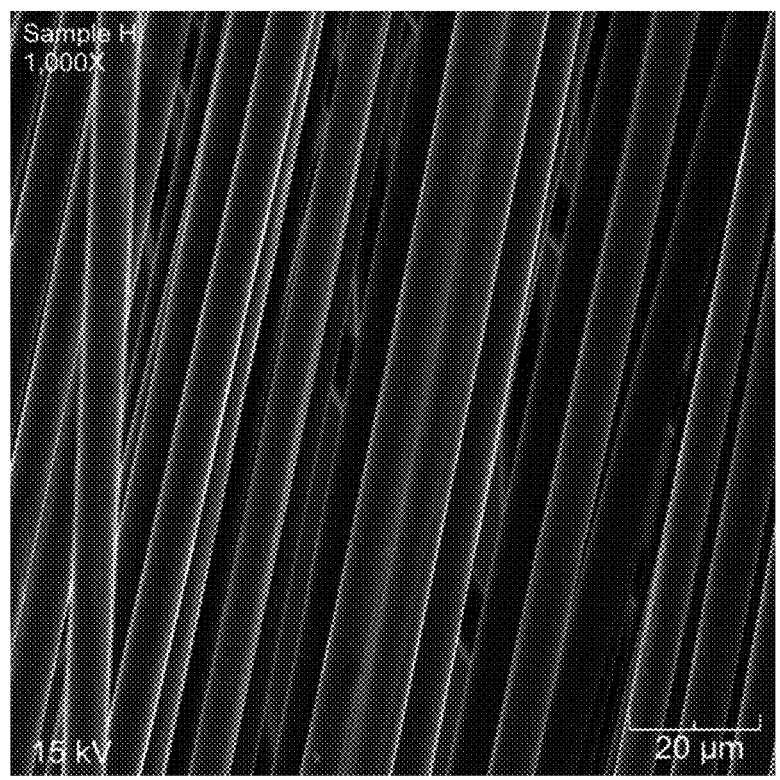

FIGS. 5-11 show scanning electron microscope (SEM) images of recovered carbon fibers from each of Examples 1-7, respectively. As seen in FIGS. 5 and 6, recovered carbon fibers from Examples 1 and 2 (which include a solvent wash but no carbon dioxide rinse) are mostly free of matrix material, although there appears to be some matrix material as well as sizing material that remains attached to the carbon fibers. As seen in FIG. 7, adding a liquid $CO_2$ rinse in Example 3 appears to help remove at least some additional matrix material relative to Examples 1 and 2. As seen in FIG. 8, substituting a supercritical $CO_2$ rinse in Example 4 for the liquid $CO_2$ rinse of Example 3 appears to remove some additional matrix material and/or sizing material relative to Example 3. Likewise as seen in FIG. 9, adding a rapid $CO_2$ sublimation step after the liquid $CO_2$ rinse in the processing of Example 5 appears to remove some additional matrix material and/or sizing material relative to Example 4. As seen in FIG. 10, performing two liquid $CO_2$ rinse steps followed by a rapid sublimation step in Example 6 appears to further clean carbon fibers of some additional matrix material and/or sizing material relative to Example 5. As seen in FIG. 11, performing an additional rapid sublimation step before a second liquid $CO_2$ rinse in Example 7 appears to further clean the carbon fibers of matrix material and/or sizing material relative to Example 6. The recovered carbon fibers shown in FIG. 11 appear to be cleaned of matrix material and sizing material to a very high degree.

The foregoing discussion of the invention and different aspects thereof has been presented for purposes of illustration and description. The foregoing is not intended to limit the invention to only the form or forms specifically disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art. Although the description of the invention has included description of one or more possible embodiments and certain variations and modifications, other variations and modifications are within the scope of the invention, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate, disclaim or disavow any patentable subject matter. Furthermore, any feature described or claimed with respect to any disclosed variation may be combined in any combination with one or more of any other features of any other variation or variations, to the extent that the features are not necessarily technically compatible, and all such combinations are within the scope of the present invention. The description of a feature or features in a particular combination do not exclude the inclusion of an additional feature or features. Processing steps and sequencing are for illustration only, and such illustrations do not exclude inclusion of other steps or other sequencing of steps. Additional steps may be included between illustrated processing steps or before or after any illustrated processing step. Illustrated processing steps may include processing operations (e.g., sub-steps) in addition to particular processing operations illustrated or discussed with respect to the illustrated processing step.

The terms "comprising", "containing", "including" and "having", and grammatical variations of those terms, are intended to be inclusive and nonlimiting in that the use of such terms indicates the presence of some condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or the appropriate grammatical variation of such narrower terms). For example, a statement that some thing "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term "at least a portion" means all or a portion that is less than all. The term "at least a part" means all or a part that is less than all. Pressures disclosed herein are absolute pressures, and not gauge pressures, unless otherwise indicated. Percentages in relation to composition of liquids and solids disclosed here in are weight percentages unless otherwise indicated and in relation to composition of gases disclosed herein are in volume percent unless otherwise indicated.

What is claimed is:

1. A method for processing a sized fiber product comprising reinforcing fibers with fiber sizing material on the reinforcing fibers in the absence of a matrix for recovery of the reinforcing fibers from the sized fiber product, the method comprising:
   providing the sized fiber product, wherein the sized fiber product comprises reinforcing fibers and fiber sizing comprising fiber sizing material on the reinforcing fibers and with the sized fiber product being in the absence of a matrix;
   first treating the sized fiber product with a normally-liquid first solvent for the fiber sizing material to prepare a first treated solid residue comprising the reinforcing fibers, the first treating comprising contacting the sized fiber product with the first solvent and first dissolving at least a majority by weight of the fiber sizing material into the first solvent; and
   after the first treating, second treating at least a portion of the first treated solid residue comprising the reinforcing fibers to remove a residual portion of the first solvent associated with the first solid residue and prepare second treated solid residue;
   prior to the second treating, separating a portion of the first solvent loaded with dissolved fiber sizing material from the first treated solid residue, wherein as provided to the second treating the first treated solid residue is in the presence of a residual portion of the first solvent following the separating;
   and wherein:
   the second treating comprises contacting the at least a portion of the first treated solid residue with a second solvent of a normally-gaseous material under conditions of temperature and pressure at which the normally-gaseous material is in a fluid form of a liquid or supercritical fluid;
   the normally-gaseous material is chemically inert with respect to the reinforcing fibers;
   the normally-gaseous material in the fluid form is a second solvent for the first solvent; and
   the second treating comprises dissolving the residual portion of the first solvent into the second solvent in the fluid form.

2. A method according to claim 1, comprising dissolving at least 80 weight percent of the fiber sizing material into the first solvent during the first treating; and;
   wherein the first solvent is chemically inert with respect to the reinforcing fibers.

3. A method according to claim 2, wherein the fiber sizing material includes a member selected from the group consisting of maleic anhydride grafted polypropylene, polyurethane, epoxy, polyamide, polyimide, phenoxy ethylene maleic anhydride, butadiene maleic anhydride, ethylene acrylic acid, acrylic dispersions, a silane compound, or combinations thereof.

4. A method according to claim 2, wherein the reinforcing fibers comprise carbon fibers.

5. A method according to claim 2, wherein the reinforcing fibers comprise fibers selected from the group consisting of carbon nanotube fibers, aramid fibers, glass fibers, boron fibers, basalt fibers, high-modulus polyethylene fibers, poly p-phenylene-2,6-benzobisoxazole fibers, quartz fibers, ceramic fibers, stainless steel fibers, titanium fibers, copper fibers, nickel fibers, metal coated fibers, natural fibers and combinations thereof.

6. A method according claim 2, wherein the first solvent comprises a member selected from the group consisting of acetone, methylene chloride, methoxy-nonafluorobutane, 2-methyltetrahydrofuran, tetrahydrofuran, tetrachloroethylene, n-propyl bromide, dimethyl sulfoxide, polyolester oil and combinations thereof.

7. A method according to claim 2, wherein the first solvent comprises a member selected from the group consisting of, esters, ethers, acetates, acids, alkalis, amines, ketones, glycol ethers, glycol ether esters, ether esters, ester-alcohols, alcohols, halogenated hydrocarbons, paraffinic hydrocarbons, aliphatic hydrocarbons, aromatic hydrocarbons and combinations thereof.

8. A method according to claim 2, wherein the dissolving during the first treating is conducted at a temperature in a range of from 10° C. to 40° C. and a pressure in a range of from 0.1 MPa to 1 MPa.

9. A method according to claim 1, wherein the normally-gaseous material is carbon dioxide.

10. A method according to claim 1, wherein the normally-gaseous material comprises a member selected from a group consisting of 1,1,1,2-Tetrafluoroethane, difluoromethane, pentafluoroethane, and combinations thereof.

11. A method according to claim 1, wherein a temperature of the contacting of the second treating is in a range of from 0° C. to 175° C. the pressure of the contacting of the second treating is in a range of from 2 MPa to 69 MPa.

12. A method according to claim 11, wherein the normally-gaseous material is carbon dioxide.

13. A method according to claim 1, comprising:
recovering rich first solvent from the first treating that is rich in dissolved material of the fiber sizing material;
distilling the rich first solvent to vaporize at least a portion of the first solvent and recovering vapor of the first solvent;
condensing and recycling as feed to the first treating at least a portion of the recovered vapor of the first solvent; and
recovering precipitated solid material of the fiber sizing material formed during the distilling.

14. A method according to claim 1, wherein the sized fiber product is in a continuous form comprising continuous reinforcing fibers, and wherein the first treated solid residue and the second treated solid residue each includes the continuous reinforcing fibers maintained in the continuous form.

15. A method according to claim 14, further comprising:
transferring the continuous reinforcing fibers in the continuous form from a source spool to a destination spool.

16. A method according to claim 14, wherein the sized fiber product is in the continuous form comprising the continuous reinforcing fibers wherein the continuous form has a length of at least 1 meter.

17. A method according to claim 1, wherein the sized fiber product is comprised of no more than 10 weight percent of all components of the sized fiber product other than the reinforcing fibers.

18. A method for processing a sized fiber product comprising reinforcing fibers with fiber sizing material on the reinforcing fibers in the absence of a matrix for recovery of the reinforcing fibers from the sized fiber product, the method comprising:
first treating the sized fiber product comprising reinforcing fibers with fiber sizing material on the reinforcing fibers in the absence of a matrix with a normally-liquid first solvent for the fiber sizing material to prepare a first treated solid residue comprising the reinforcing fibers, the first treating comprising contacting the sized fiber product with the first solvent and first dissolving at least a majority by weight of the fiber sizing material into the first solvent;
after the first treating, second treating at least a portion of the first treated solid residue comprising the reinforcing fibers to remove a residual portion of the first solvent associated with the first solid residue and prepare second treated solid residue;
after the second treating, third treating at least a portion of the second treated solid residue comprising the reinforcing fibers, the third treating comprising:
first converting a normally-gaseous substance in contact with the at least a portion of the second treated solid residue from a fluid form to a solid form, the first converting comprising reducing a temperature of the normally-gaseous substance; and
after the first converting, second converting the normally-gaseous substance from the solid form to a gaseous form, to assist dislodgment from the reinforcing fibers of residual fiber sizing material.

\* \* \* \* \*